(12) United States Patent
Tsukahara

(10) Patent No.: US 10,855,925 B2
(45) Date of Patent: Dec. 1, 2020

(54) INFORMATION PROCESSING DEVICE, INFORMATION PROCESSING METHOD, AND PROGRAM

(71) Applicant: SONY CORPORATION, Tokyo (JP)

(72) Inventor: Tsubasa Tsukahara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 48 days.

(21) Appl. No.: 15/743,921

(22) PCT Filed: Jun. 17, 2016

(86) PCT No.: PCT/JP2016/068146
§ 371 (c)(1),
(2) Date: Jan. 11, 2018

(87) PCT Pub. No.: WO2017/051570
PCT Pub. Date: Mar. 30, 2017

(65) Prior Publication Data
US 2018/0205888 A1 Jul. 19, 2018

(30) Foreign Application Priority Data
Sep. 24, 2015 (JP) ................................ 2015-187005

(51) Int. Cl.
*H04N 5/232* (2006.01)
*G09G 5/38* (2006.01)
(Continued)

(52) U.S. Cl.
CPC ......... *H04N 5/23296* (2013.01); *G06F 3/012* (2013.01); *G06F 3/147* (2013.01);
(Continued)

(58) Field of Classification Search
CPC ............................ H04N 5/23296; G06F 3/012
See application file for complete search history.

(56) References Cited

U.S. PATENT DOCUMENTS

2009/0244064 A1* 10/2009 Inokuchi ................. A63F 13/10
345/420
2010/0069152 A1* 3/2010 Nishimura ............... A63F 13/10
463/31
(Continued)

FOREIGN PATENT DOCUMENTS

EP 2685351 A1 1/2014
JP 2005-230263 A 9/2005
(Continued)

OTHER PUBLICATIONS

Microsoft Lync: "An update that enables users to control whether video is cropped is available tor Lync 2013", Feb. 20, 2013 (Feb. 20, 2013), XPO55711467, Retrieved from: https://support.microsoft.com/en-us/help/2814254/an-update-that-enables-users-to-control-whether-video-is-cropped-is-av.

*Primary Examiner* — Santiago Garcia
(74) *Attorney, Agent, or Firm* — Paratus Law Group, PLLC

(57) ABSTRACT

There is provided an information processing device, an information processing method, and a program to enable an observer to visually recognize an image in a virtual space with higher convenience, the information processing device including: a control unit that controls, on a basis of a gazing point or a gazing target of an observer to an image in a virtual space, an angle-of-view of a virtual camera for defining the image in the virtual space; and an image information output unit that outputs information about the image in the virtual space.

20 Claims, 21 Drawing Sheets

(51) Int. Cl.
  *G09G 5/36* (2006.01)
  *G09G 5/02* (2006.01)
  *G06F 3/01* (2006.01)
  *H04N 7/15* (2006.01)
  *G06T 19/00* (2011.01)
  *G09G 5/00* (2006.01)
  *G06F 3/147* (2006.01)

(52) U.S. Cl.
  CPC ............... *G06T 19/00* (2013.01); *G09G 5/00* (2013.01); *G09G 5/026* (2013.01); *G09G 5/36* (2013.01); *G09G 5/38* (2013.01); *H04N 7/15* (2013.01); *G09G 2340/045* (2013.01)

(56) References Cited

U.S. PATENT DOCUMENTS

| | | | |
|---|---|---|---|
| 2011/0118015 A1* | 5/2011 | Yamamoto | A63F 13/213 463/30 |
| 2012/0004017 A1* | 1/2012 | Sakurai | A63F 13/5258 463/2 |
| 2012/0007882 A1* | 1/2012 | Sakurai | G06F 3/04815 345/619 |
| 2012/0030743 A1 | 2/2012 | Semba | |
| 2012/0198337 A1 | 8/2012 | Flint et al. | |
| 2013/0188834 A1* | 7/2013 | Ebisawa | A61B 3/113 382/103 |
| 2013/0225289 A1* | 8/2013 | Yoshimitsu | A63F 13/10 463/31 |
| 2013/0229547 A1* | 9/2013 | Takegawa | G02B 13/009 348/231.99 |
| 2013/0231590 A1 | 9/2013 | Corbett et al. | |
| 2014/0002580 A1* | 1/2014 | Bear | H04N 5/445 348/14.07 |
| 2014/0015778 A1* | 1/2014 | Taguchi | G06F 3/041 345/173 |
| 2014/0267803 A1* | 9/2014 | Shintani | H04N 5/23293 348/208.2 |
| 2015/0031450 A1* | 1/2015 | Matsuura | A63F 13/00 463/31 |
| 2015/0306500 A1* | 10/2015 | Edsall | A63F 13/5258 463/31 |
| 2016/0041391 A1* | 2/2016 | Van Curen | G02B 27/0172 345/633 |
| 2016/0114243 A1* | 4/2016 | Matsuura | A63F 13/5258 463/31 |
| 2017/0148339 A1* | 5/2017 | Van Curen | G09B 9/003 |
| 2017/0188930 A1* | 7/2017 | Lahvis | A61B 5/1118 |
| 2017/0249009 A1* | 8/2017 | Parshionikar | G06K 9/0053 |
| 2018/0031848 A1* | 2/2018 | Huang | G02B 27/017 |
| 2018/0189550 A1* | 7/2018 | McCombe | G06K 9/00288 |
| 2018/0321493 A1* | 11/2018 | Kim | G02B 27/01 |

FOREIGN PATENT DOCUMENTS

| | | |
|---|---|---|
| JP | 2006-209319 A | 8/2006 |
| JP | 2008-029694 A | 2/2008 |
| JP | 2009-081881 A | 4/2009 |
| JP | 2009-237680 A | 10/2009 |
| JP | 2011-156061 A | 8/2011 |
| JP | 2012-155654 A | 8/2012 |
| JP | 2012-212237 A | 11/2012 |
| JP | 2015-125641 A | 7/2015 |
| WO | 2015015469 A1 | 2/2015 |

* cited by examiner

FIG. 1
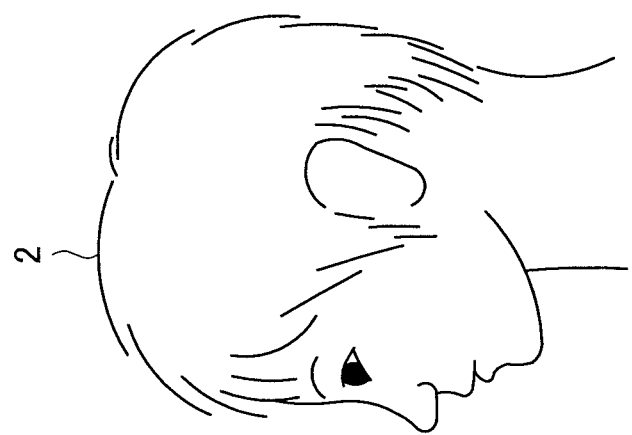
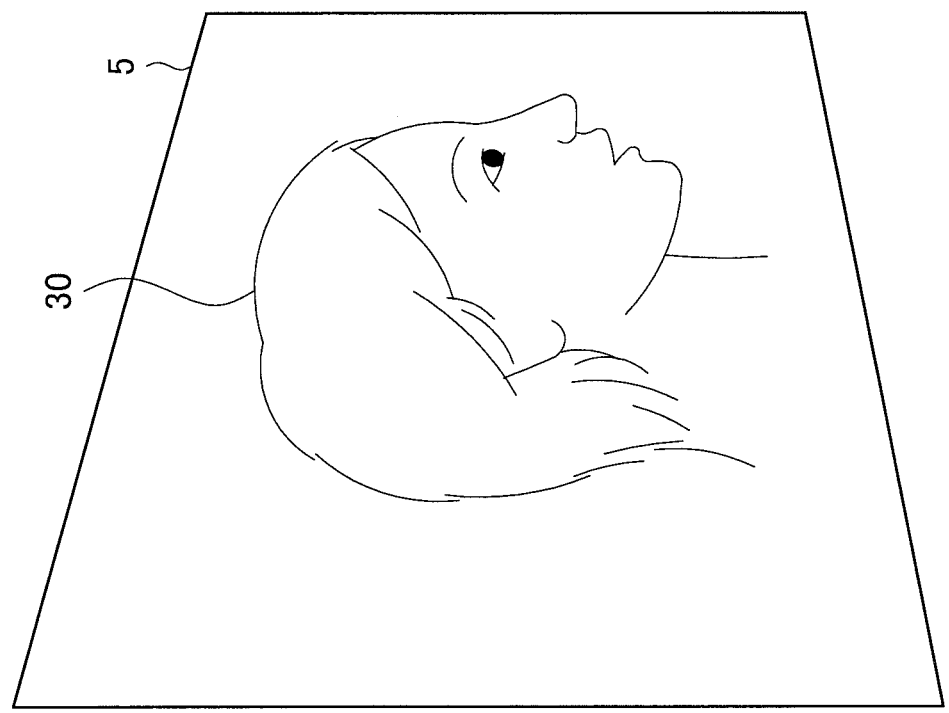

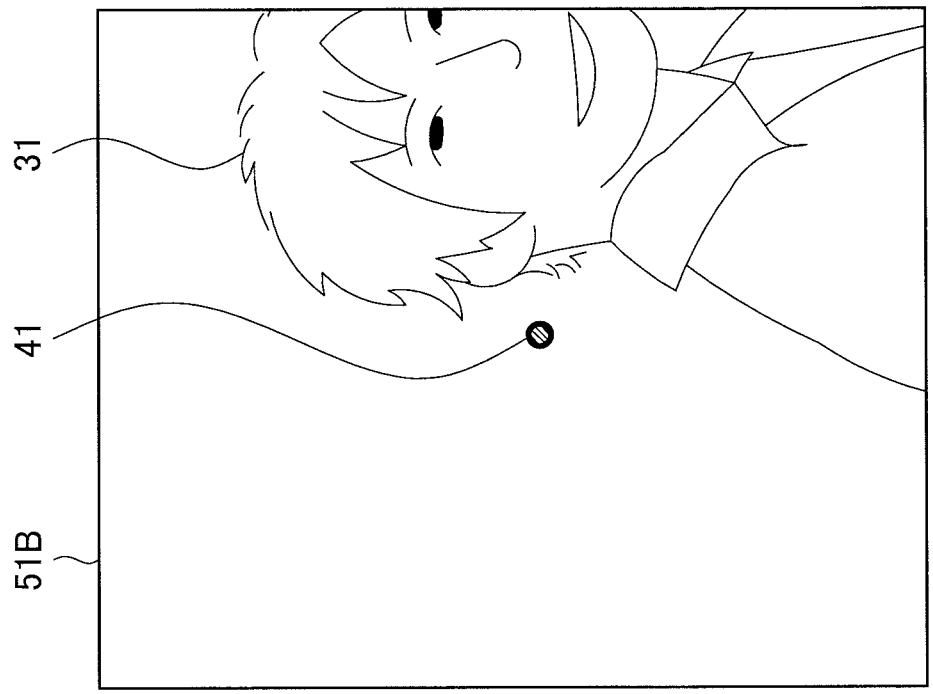
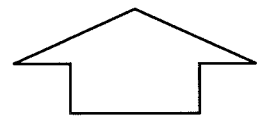
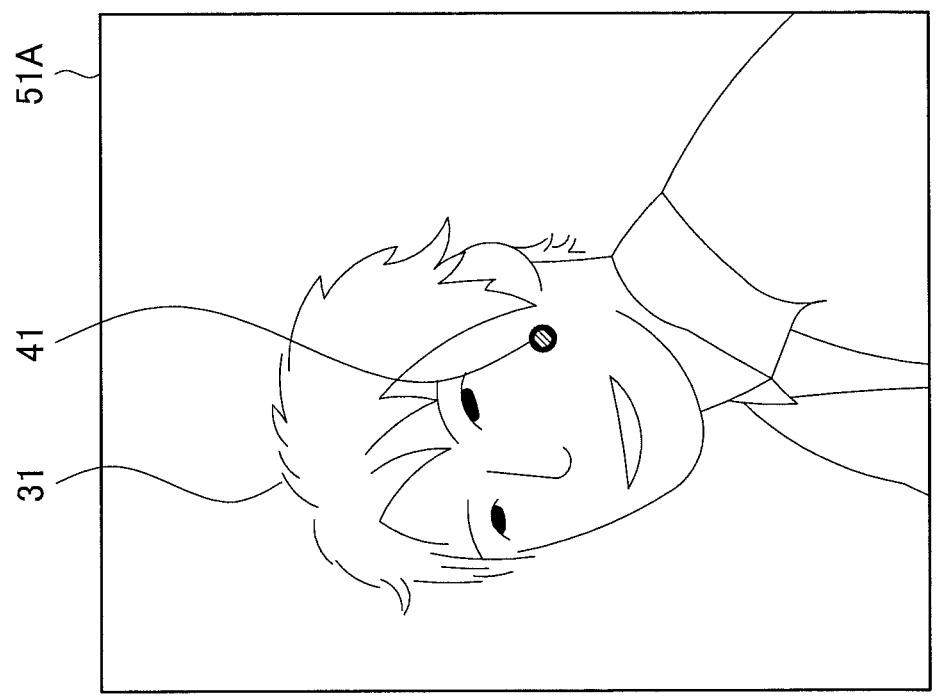
FIG. 2A

FIG. 2B
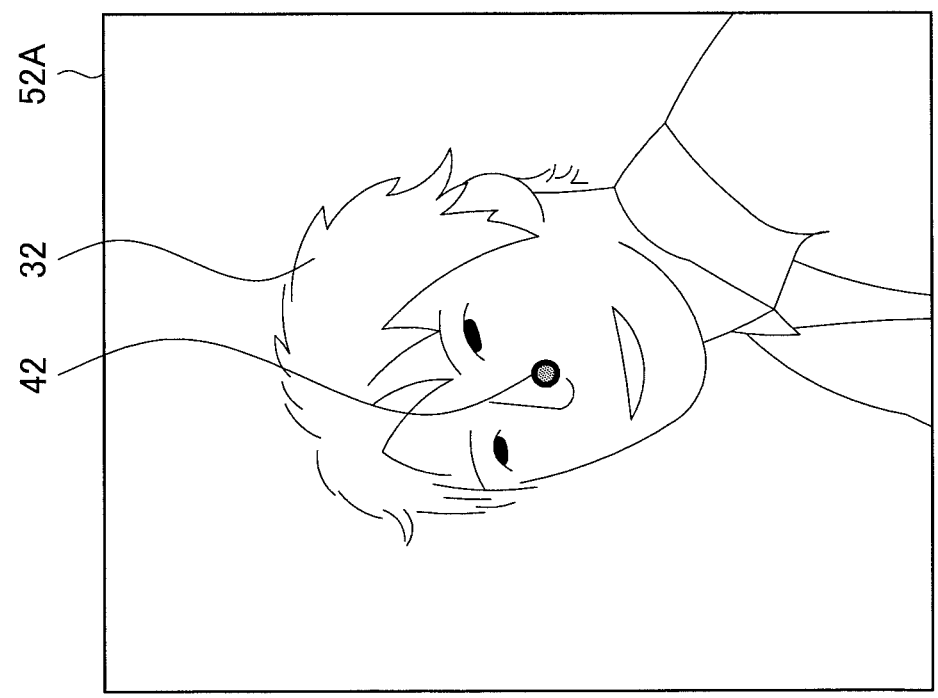

FIG. 5B
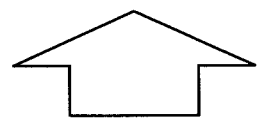
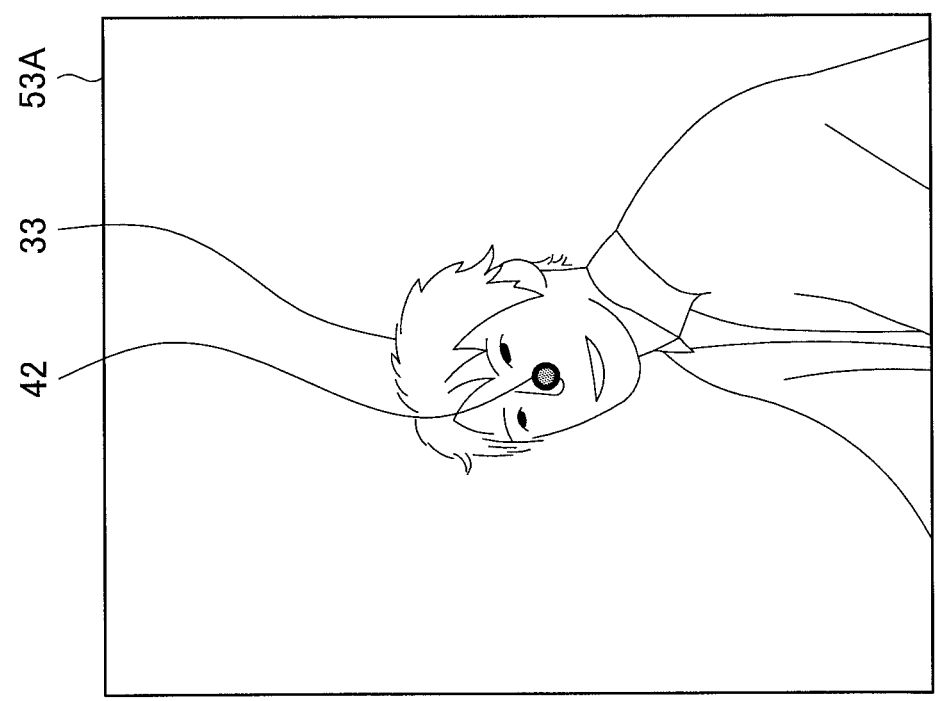

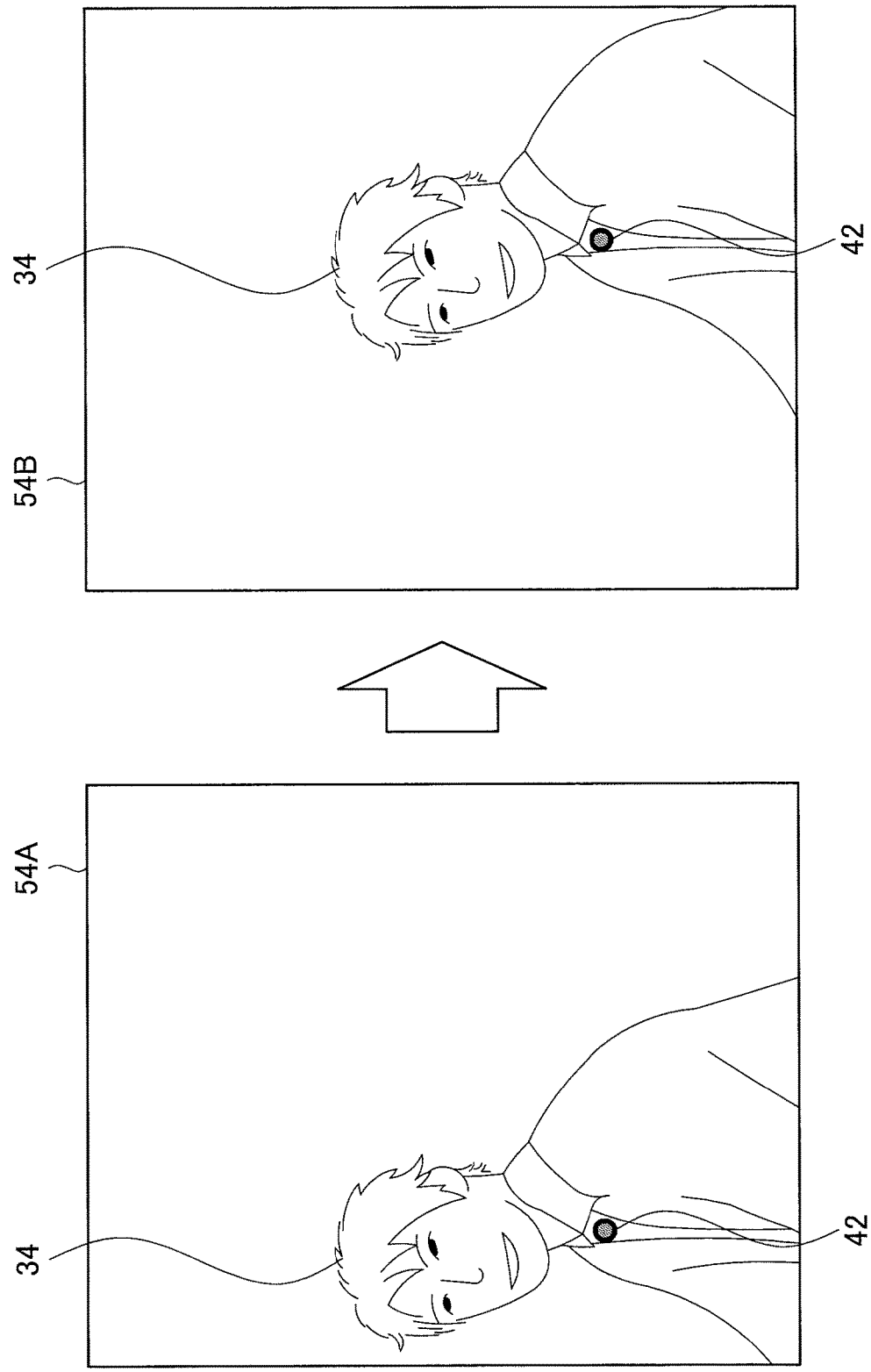

FIG. 16
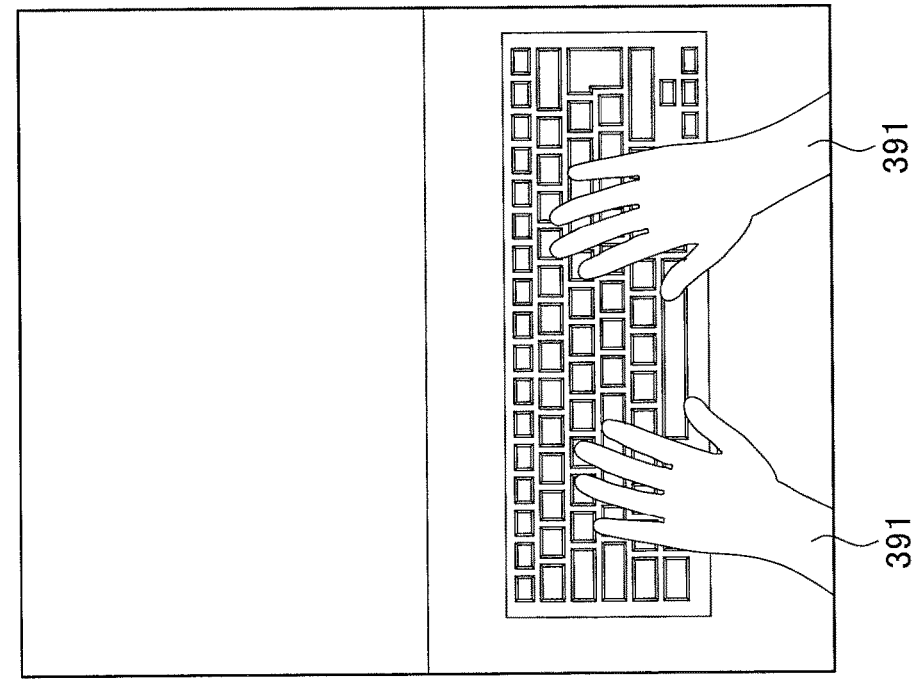
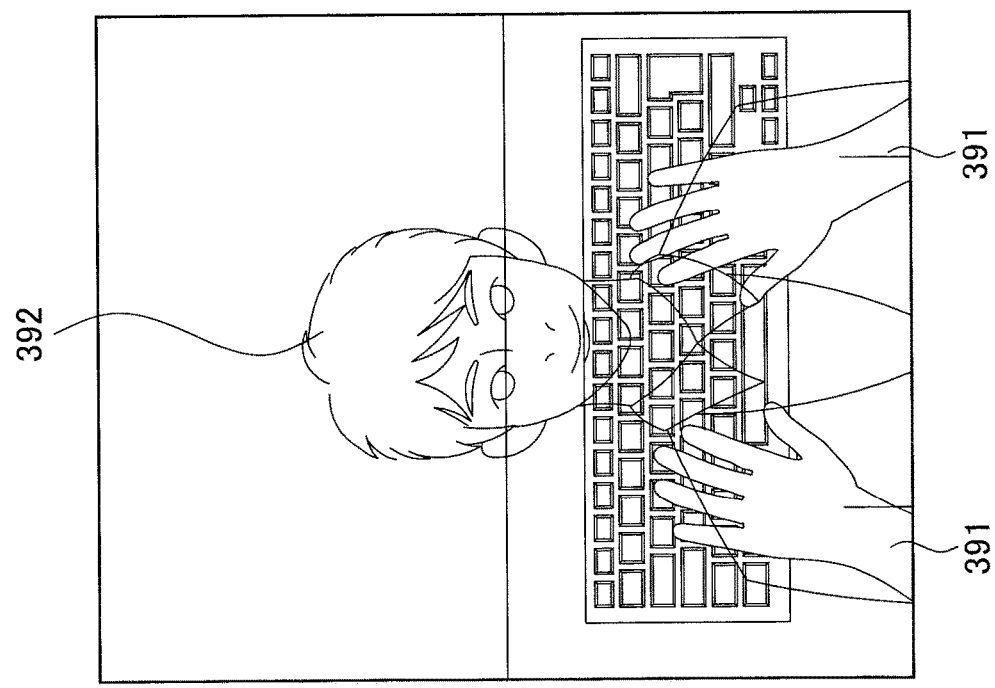

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2016/068146 (filed on Jun. 17, 2016) under 35 U.S.C. § 371, which claims priority to Japanese Patent Application No. 2015-187005 (filed on Sep. 24, 2015), which are all hereby incorporated by reference in their entirety.

TECHNICAL FIELD

The present disclosure relates to an information processing device, an information processing method, and a program.

BACKGROUND ART

In recent years, it has been examined that an image in a virtual space is used as an output interface to an observer.

For example, in a TV conference system as disclosed in the following Patent Literature 1, it is examined that an image in a virtual space is applied. Specifically, in the TV conference system, it is examined to allow an observer to visually recognize, not an image in a real space, but an image in a virtual space where a viewpoint can freely be changed in the space. In such a case, the observer can visually recognize images in various viewpoints, which enables the sensing of more information.

The viewpoint is changed in such an image in the virtual space generally by controlling an angle-of-view of a virtual camera for defining the image in the virtual space while using the origin in the virtual space as a reference.

CITATION LIST

Patent Literature

Patent Literature 1: JP 2009-81881A

DISCLOSURE OF INVENTION

Technical Problem

However, in a case of controlling the angle-of-view of the virtual camera while setting, as a reference, the origin in the virtual space irrespective of a target to be visually recognized by the observer, the observer easily loses the target to be visually recognized. Therefore, regarding the image in the virtual space included in the angle-of-view of the virtual camera controlled with the above-mentioned method, the convenience is low for the observer.

Hence, according to the present disclosure, an information processing device, an information processing method, and a program are proposed to enable an observer to visually recognize an image in a virtual space with higher convenience.

Solution to Problem

According to the present disclosure, there is provided an information processing device including: a control unit that controls, on a basis of a gazing point or a gazing target of an observer to an image in a virtual space, an angle-of-view of a virtual camera for defining the image in the virtual space; and an image information output unit that outputs information about the image in the virtual space.

In addition, according to the present disclosure, there is provided an information processing method including: controlling, on a basis of a gazing point or a gazing target of an observer to an image in a virtual space, an angle-of-view of a virtual camera for defining the image in the virtual space by an arithmetic processing device; and outputting information about the image in the virtual space.

Furthermore, according to the present disclosure, there is provided a program that causes a computer to function as: a control unit that controls, on a basis of a gazing point or a gazing target of an observer to an image in a virtual space, an angle-of-view of a virtual camera for defining the image in the virtual space; and an image information output unit that outputs information about the image in the virtual space.

According to the present disclosure, it is possible to control the angle-of-view of the virtual camera on the basis of the target to be visually recognized by the observer.

Advantageous Effects of Invention

As mentioned above, according to the present disclosure, the observer can visually recognize the image in a virtual space with higher convenience.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is an explanatory diagram explaining the outline of an information processing device according to a first embodiment of the present disclosure.

FIG. 2A is an explanatory diagram explaining control of an angle-of-view of a virtual camera according to Comparative Example.

FIG. 2B is an explanatory diagram explaining control of an angle-of-view of a virtual camera according to the embodiment.

FIG. 5B is an explanatory diagram illustrating an image example in zoom-in of the virtual camera.

FIG. 6B is an explanatory diagram illustrating an image example in parallel movement of the virtual camera.

FIG. 16 is an explanatory diagram explaining an information processing device according to a first modified example of the embodiment.

MODE(S) FOR CARRYING OUT THE INVENTION

Figure 3:
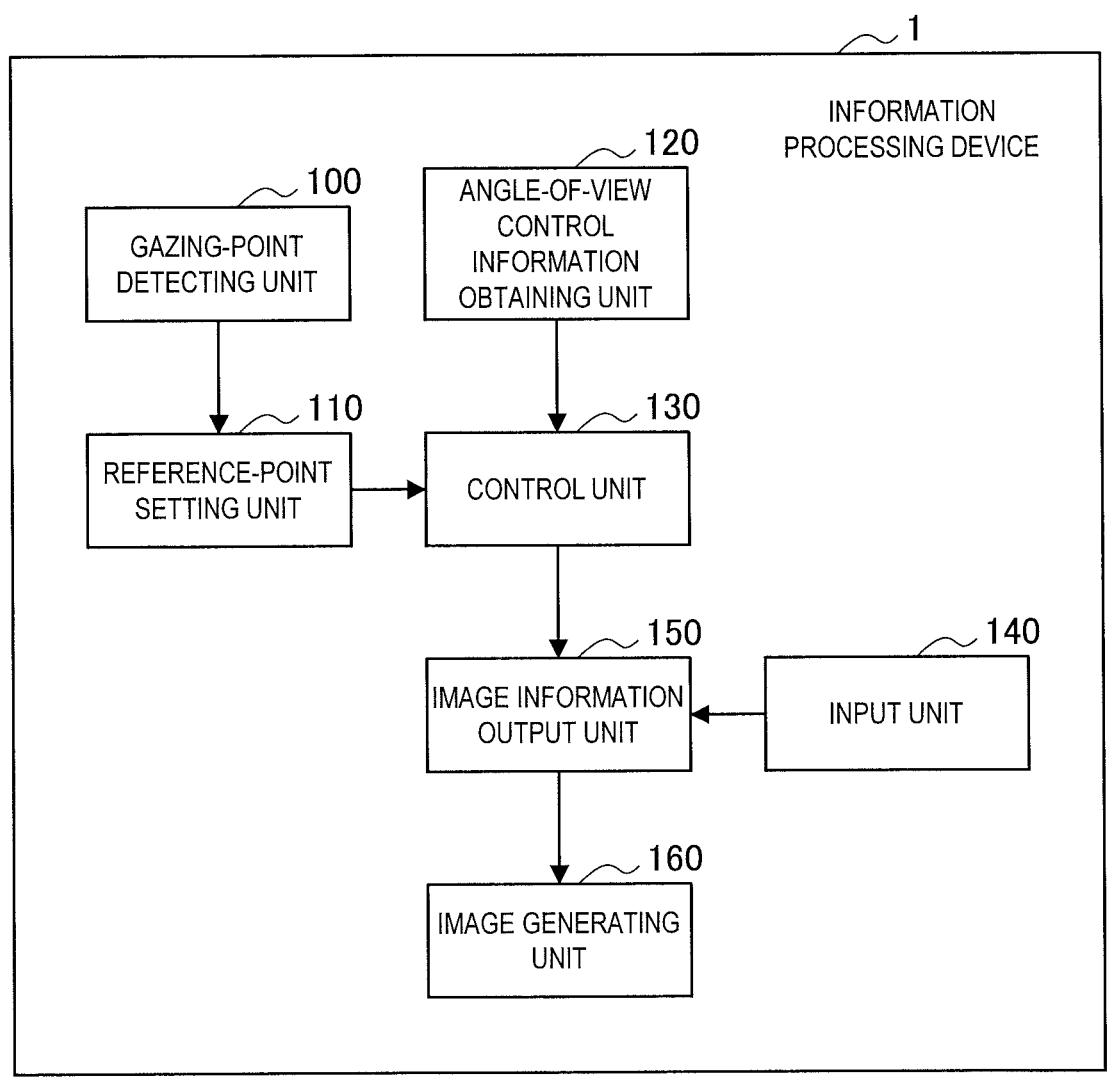
FIG. 3 is a block diagram explaining a functional configuration of the information processing device according to the embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
1. First Embodiment
1.1. Outline of information processing device
1.2. Configuration of information processing device
1.3. Operation of information processing device
1.4. Application of information processing device
2. Second Embodiment
2.1. Configuration of information processing device
2.2. Application of information processing device
2.3. Modified examples
3. Example of hardware configuration
4. Conclusion

1. First Embodiment

1.1. Outline of Information Processing Device

First of all, a description will be given of the outline of an information processing device according to an embodiment of the present disclosure with reference to FIGS. 1 to 2B. FIG. 1 is an explanatory diagram explaining the outline of the information processing device according to the present embodiment. Also, FIG. 2A is an explanatory diagram explaining control of an angle-of-view of a virtual camera according to Comparative Example, and FIG. 2B is an explanatory diagram explaining control of an angle-of-view of a virtual camera according to the present embodiment.

As illustrated in FIG. 1, the information processing device according to the present embodiment generates an image 5 in a virtual space visually recognized by an observer 2. The virtual space is a virtual three-dimensional space constructed by information processing executed by the information processing device. Also, the image 5 in the virtual space is obtained in a case where the virtual camera installed at a predetermined position in the virtual space images the virtual space.

Such an image 5 in the virtual space can be used for, e.g., a TV phone, a TV conference, and the like. For example, the image 5 in the virtual space may be an image including an image 30 of an observed person existing in a real space at a remote area.

As mentioned above, contents of the image 5 in the virtual space are defined by the angle-of-view of the virtual camera set in the virtual space. The information processing device controls the angle-of-view of the virtual camera, thereby enabling the change of the image 5 in the virtual space visually recognized by the observer 2. Specifically, the information processing device controls the position and the direction of the virtual camera in the virtual space, thereby enabling the observer 2 to visually recognize images in the virtual space from various viewpoints.

Herein, in a case of rotating the angle-of-view of the virtual camera while setting a fixed point (e.g., the origin in the virtual space or the like) irrespective of the target visually recognized by the observer 2 as the rotational center, it is difficult for the target visually recognized by the observer 2 to continuously be captured in the center of the angle-of-view of the virtual camera.

For example, in a case of rotating the angle-of-view of the virtual camera while setting a fixed point 41 in the virtual space as the rotational center in an image 51A in the virtual space including an image 31 of the observed person illustrated in FIG. 2A, in an image 51B after the rotation, the image 31 of the observed person is moved to a position out of the center of the image 51B. This is because, in the case of rotating the angle-of-view of the virtual camera, as the target is more apart from the rotational center, the target is largely moved with the rotation.

That is, under such control of the angle-of-view of the virtual camera, it is difficult to control the position and the direction of the virtual camera while continuously capturing the target to be visually recognized by the observer 2 in the center. In particular, in a case where the distance is long between the fixed point as the rotational center of the angle-of-view of the virtual camera and the target to be visually recognized, even in rotation with a small angle-of-view, the target to be visually recognized can be out of the angle-of-view of the virtual camera and the convenience is low.

On the other hand, the information processing device according to the present embodiment controls the angle-of-view of the virtual camera on the basis of a gazing point or a gazing target of the observer 2 in the image in the virtual space. For example, the gazing point is detected from an image 52A in the virtual space including an image 32 of the observed person illustrated in FIG. 2B on the basis of line-of-sight information of the observer 2 in the image 52A, and the angle-of-view of the virtual camera is rotated while setting a reference point 42 based on the detected gazing point as the rotational center. In such a case, in an image 52B after the rotation, the image 32 of the observed person can be positioned to the center of the image 52B. This is because, in many cases, the observer 2 gazes at the target to be visually recognized and, by rotating the angle-of-view of the virtual camera while setting the reference point 42 based on the gazing point of the observer 2 as the rotational center, the amount of movement of the target visually recognized by the observer 2 can be therefore made small.

With such an information processing device according to the present embodiment, it is possible to control the angle-of-view of the virtual camera and freely change the viewpoint in the virtual space while continuously capturing the target to be visually recognized by the observer 2 in the center of the image in the virtual space. Also, with the information processing device according to the present embodiment, when changing the angle-of-view of the virtual camera, it is possible to prevent the target visually recognized by the observer 2 from being out of the angle-of-view of the virtual camera and prevent the target visually recognized by the observer 2 from being lost. Therefore, with the information processing device according to the present embodiment, it is possible to improve the convenience of the image in the virtual space for the observer 2.

Further, with the information processing device according to the present embodiment, it is possible to dynamically change a reference point for controlling the angle-of-view of the virtual camera in the virtual space. In such a case, the observer 2 gazes at the target to be visually recognized, thereby enabling the change of the reference point of the control of the angle-of-view of the virtual camera. As a consequence, the information processing device according to the present embodiment allows the observer 2 to instinctively change the position and the direction of the virtual camera, and to visually recognize images in the virtual space in various viewpoints.

Note that the information processing device according to the present embodiment may be a display device that displays the image in the virtual space, or an information processing device that generates the image in the virtual space and outputs image information to an external display device. For example, the information processing device according to the present embodiment may be a transmission-type or shielding-type head-mounted display device, a dome-type display that can display an image on the whole ceiling, display devices such as a liquid crystal display device and an organic electro-luminescence display device, a 3D display device that can display a three-dimensional image, a projector display device that can display a two-dimensional image or a three-dimensional image, or the like, alternatively an information processing device that outputs the image information to the display devices.

Herein, the image in the virtual space generated by the information processing device according to the present embodiment may be, for example, an image generated on the basis of an image imaged by an imaging device installed in the real space, or images generated on the basis of measuring results of various sensors installed in the real space. Also, obviously, the image in the virtual space may be generated, not on the basis of information in real space or the like. Specifically, the image in the virtual space may be the point cloud image generated on the basis of depth information measured by at least one depth sensor installed in the real space. Herein, the depth sensor is a sensor that can measure the distance from the sensor to a target and output the measured distance as the depth information. Also, the point cloud image is an image obtained by expressing the target as a set of points arranged on the virtual space on the basis of the distance from the depth sensor to the target.

1.2. Configuration of Information Processing Device

Next, a description will be given of a configuration of the information processing device according to the present embodiment with reference to FIGS. 3 to 8. FIG. 3 is a block diagram explaining a functional configuration of an information processing device 1 according to the present embodiment.

As illustrated in FIG. 3, the information processing device 1 includes a gazing-point detecting unit 100, a reference-point setting unit 110, an angle-of-view control information obtaining unit 120, a control unit 130, an input unit 140, an image information output unit 150, and an image generating unit 160.

The gazing-point detecting unit 100 detects the gazing point of the observer 2. Regarding a method for detecting the gazing point by the gazing-point detecting unit 100, a publicly-known method can be used. For example, the gazing-point detecting unit 100 may analyze an image of the observer 2 imaged by an imaging device and detect the center of the eyeball and the pupil, thereby detecting the gazing point. Also, the gazing-point detecting unit 100 may detect the gazing point by using reflecting light on the cornea surface obtained by irradiating the eyeball of the observer 2 with infrared and the position of the pupil detected by the imaging device.

Further, the gazing-point detecting unit 100 may detect the line-of-sight of the observer 2 and set an intersection between the line-of-sight of the observer 2 and the image in the virtual space (e.g., a target in the foreground of the virtual space) as the gazing point of the observer 2. Furthermore, in a case where the gazing point is not detected due to the detection limit of a sensor that detects the gazing point, or the like, and only the line-of-sight of the observer 2 is detected, the gazing-point detecting unit 100 may set an intersection between the line-of-sight of the observer 2 and the detection limit of the sensor as the gazing point of the observer 2.

The reference-point setting unit 110 sets the reference point in the virtual space on the basis of the gazing point of the observer 2. Specifically, the reference-point setting unit 110 sets a reference point for controlling the angle-of-view of the virtual camera in the virtual space on the basis of the gazing point of the observer 2 detected by the gazing-point detecting unit 100. Note that, in a case where the observer 2 does not visually recognize the image in the virtual space, the reference-point setting unit 110 need not set the reference point in the virtual space, and the control unit 130, which will be described later, need not control the angle-of-view in the virtual space.

For example, the reference-point setting unit 110 may set the reference point so that the gazing point of the observer 2 always matches the reference point. Also, the reference-point setting unit 110 may set the gazing point of the observer 2 at predetermined timing as the reference point, and update the reference point at a constant cycle (e.g., every one minute or the like). Further, in a case where the amount of movement of the gazing point of the observer 2 is less than a threshold for a predetermined period (e.g., 5 sec or the like), the reference-point setting unit 110 may set the gazing point of the observer 2 at the timing as the reference point. Further, the reference-point setting unit 110 may set a point obtained by performing moving averaging on the gazing points of the observer 2 for a predetermined period (e.g., 10 sec or the like) as the reference point.

The angle-of-view control information obtaining unit 120 obtains information instructing to control the angle-of-view of the virtual camera for defining the image in the virtual space. Specifically, the angle-of-view control information obtaining unit 120 obtains information instructing to control the position and the direction of the virtual camera for defining the image in the virtual space.

For example, it is also possible that the angle-of-view control information obtaining unit 120 includes an input device for receiving an input from the observer 2, and that information instructing to control the angle-of-view of the virtual camera from the observer 2 is input by the input device. As such an input device, for example, a touch panel, a mouse, a keyboard, a button, a switch, a lever, and the like can be exemplified.

Also, the angle-of-view control information obtaining unit 120 may detect the motion of the head of the observer 2, and obtain information about the motion of the head of the observer 2 as information for controlling the angle-of-view of the virtual camera. Note that the motion of the head of the observer 2 can be detected by, for example, analysis of an image of the observer 2 imaged by the imaging device, or measurement with an acceleration sensor or the like provided for the head of the observer 2.

The control unit 130 controls the angle-of-view of the virtual camera on the basis of the reference point set on the basis of the gazing point of the observer 2. Specifically, the control unit 130 controls the angle-of-view of the virtual camera by using the reference point set by the reference-point setting unit 110 in accordance with the information instructing to control the angle-of-view of the virtual camera obtained by the angle-of-view control information obtaining unit 120. Note that, in a case of receiving an input for instructing to fix the angle-of-view of the virtual camera from the observer 2 or determining that the observer 2 does not visually recognize the image in the virtual space from line-of-sight information, the control unit 130 may switch the control to fix the angle-of-view of the virtual camera.

For example, in a case where the angle-of-view control information obtaining unit 120 is the input device that receives the input from the observer 2, the control unit 130 may rotate the angle-of-view of the virtual camera by setting the reference point as the rotational center in response to an instruction to rotate the angle-of-view of the virtual camera inputted by the observer 2. Also, the control unit 130 may zoom in or zoom out the virtual camera with respect to the reference point in response to an instruction to zoom in or zoom out the virtual camera inputted by the observer 2.

For example, in a case where the angle-of-view control information obtaining unit 120 detects the motion of the head of the observer 2, the control unit 130 may rotate the angle-of-view of the virtual camera by setting the reference point as the rotational center in accordance with the motion of the head of the observer 2. Also, the control unit 130 may zoom in or zoom out the virtual camera with respect to the reference point in accordance with the motion of the head of the observer 2, or move in parallel the virtual camera with respect to the reference point in accordance with the motion of the head of the observer 2.

Figure 4:
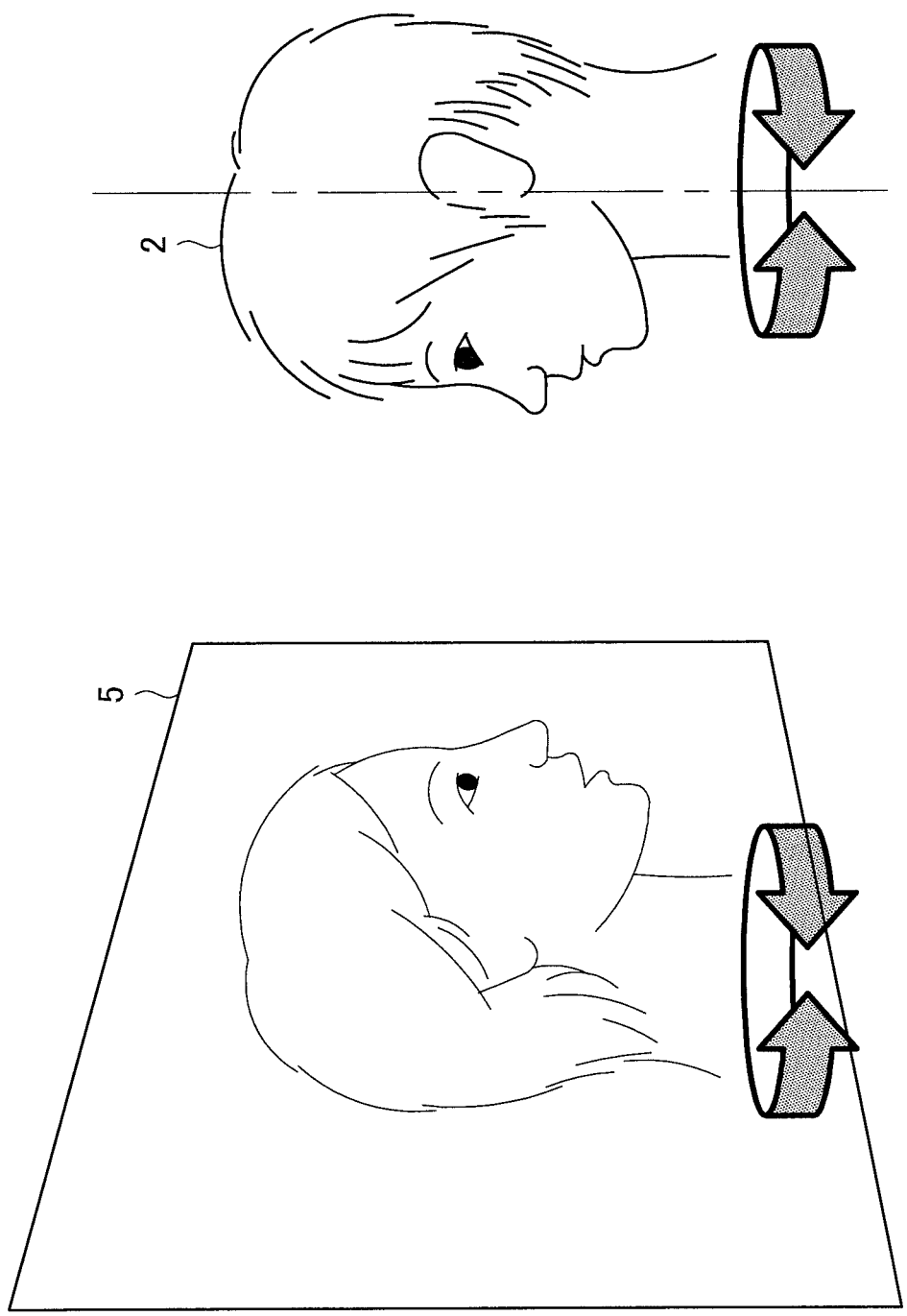
FIG. 4 is an explanatory diagram explaining rotation of an angle-of-view of the virtual camera.
Figure 5A:
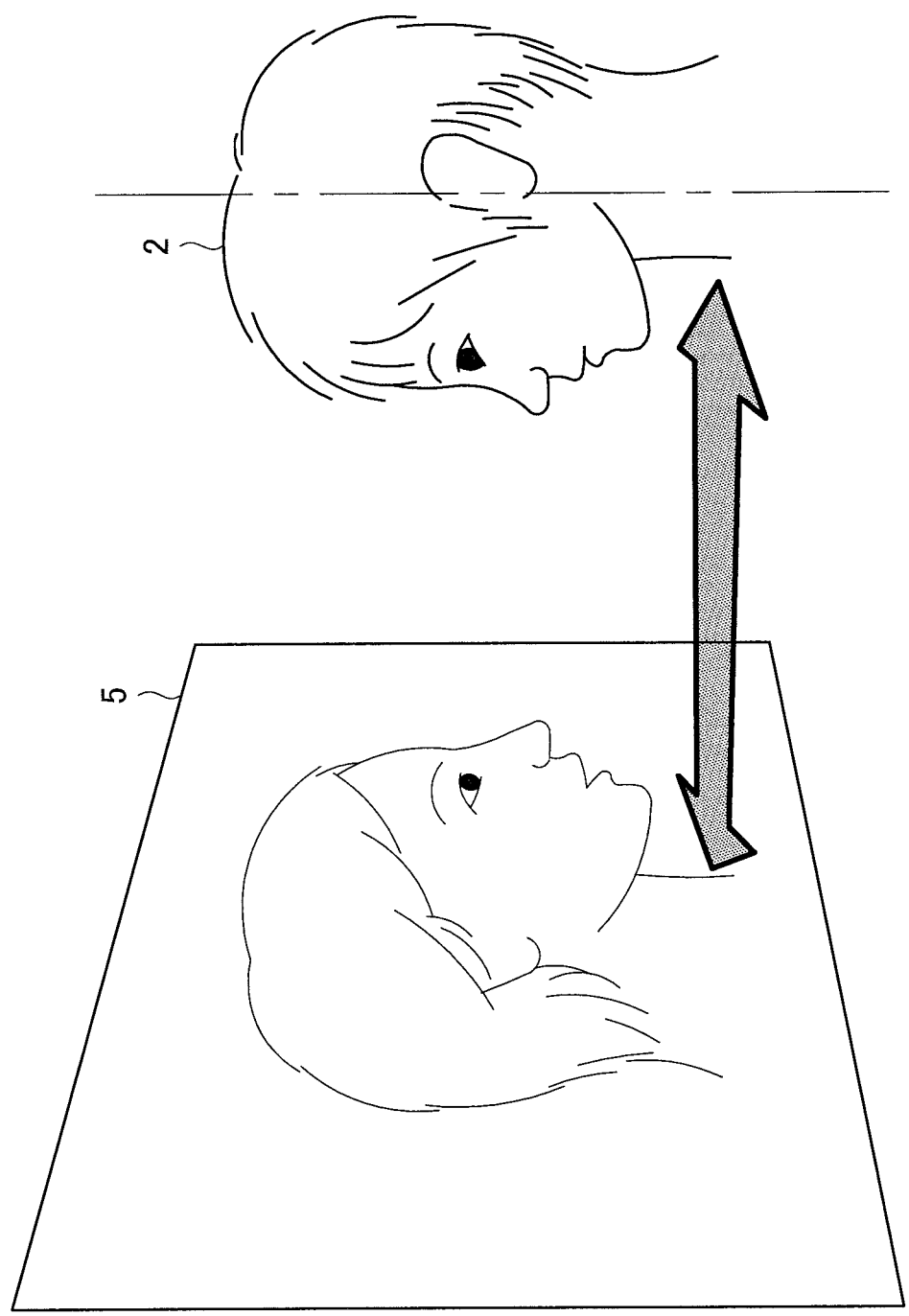
FIG. 5A is an explanatory diagram explaining zoom-in or zoom-out of the virtual camera.
Figure 6A:
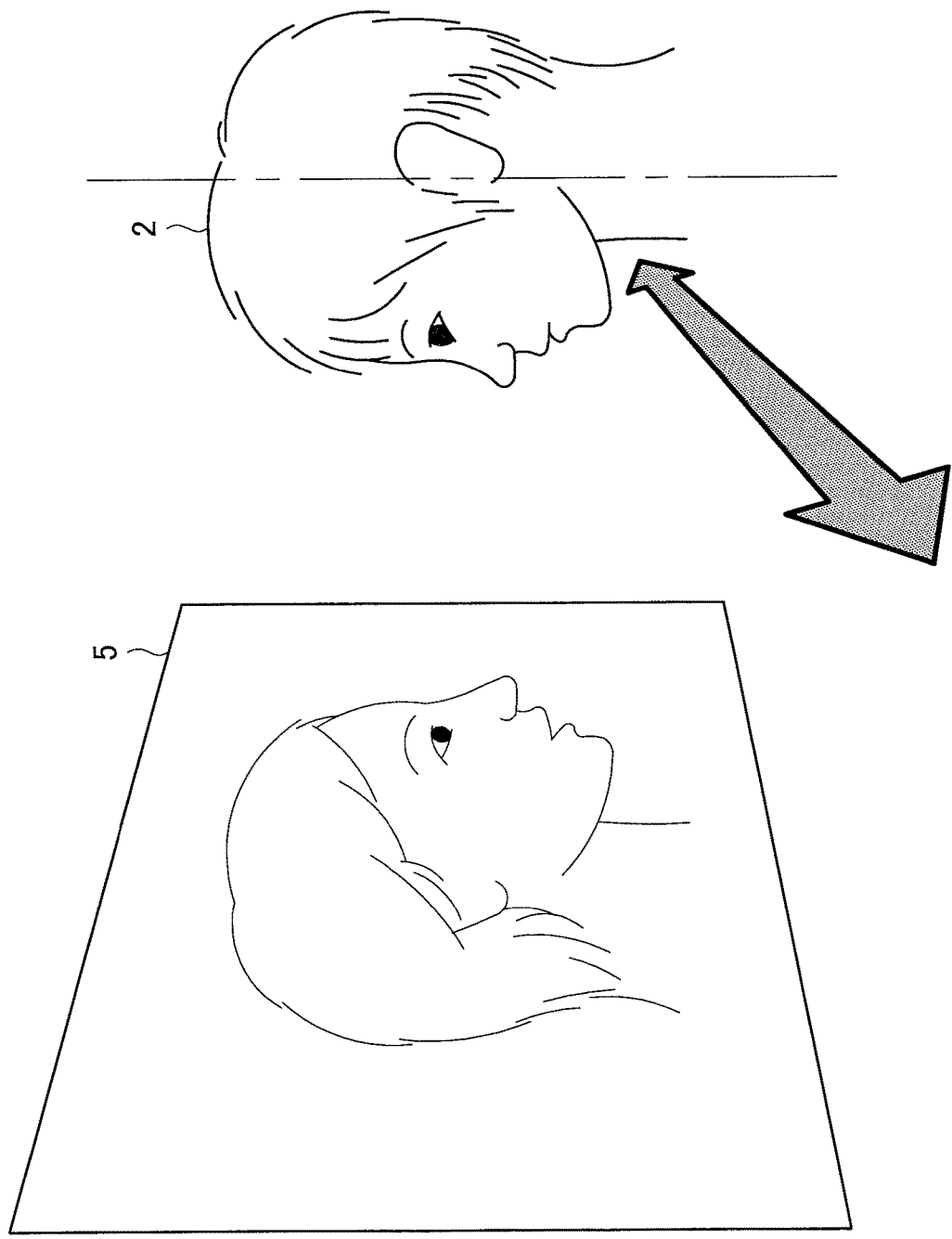
FIG. 6A is an explanatory diagram explaining parallel movement of the virtual camera.

A more specific description will be given of such a case of controlling the motion and direction of the virtual camera in accordance with the motion of the head of the observer 2 with reference to FIGS. 4 to 6B. FIG. 4 is an explanatory diagram explaining rotation of the angle-of-view of the virtual camera. Also, FIG. 5A is an explanatory diagram explaining the zoom-in or zoom-out of the virtual camera. FIG. 5B is an explanatory diagram illustrating an image example in the zoom-in of the virtual camera. Further, FIG. 6A is an explanatory diagram explaining parallel movement of the virtual camera. FIG. 6B is an explanatory diagram illustrating an image example in the parallel movement of the virtual camera.

As illustrated in FIG. 4, in a case where the head of the observer 2 is rotated, the control unit 130 rotates the angle-of-view of the virtual camera by setting the reference point as the rotational center. Specifically, the control unit 130 rotates the angle-of-view of the virtual camera so that a rotational direction of the head of the observer 2 is symmetrical to a rotational direction of the angle-of-view of the virtual camera with the reference point as the center. Under such control, the control unit 130 allows the observer 2 to visually recognize the image in the virtual space with low sense of strangeness. Also, in a case where the image 5 in the virtual space contains an image of the observed person, the control unit 130 can rotate the angle-of-view of the virtual camera so that the line-of-sight of the observer 2 who rotates the head matches the line-of-sight of the observed person of the image 5 in the virtual space. Note that, obviously, the rotation of the head of the observer 2 is not limited to rotation in the right and left direction illustrated in FIG. 4, and includes rotation in the up and down direction (e.g., rotation as a result of look-up or look-down).

Also, as illustrated in FIG. 5A, in a case where the head of the observer 2 comes close to the image 5 in the virtual space (i.e., a display device) or goes away therefrom, the control unit 130 zooms in or zooms out the virtual camera with respect to the reference point. Specifically, in a case where the head of the observer 2 comes close to the image 5 in the virtual space, the control unit 130 zooms in the virtual camera toward the reference point. Further, in a case where the head of the observer 2 goes away from the image in the virtual space, the control unit 130 zooms out the virtual camera from the reference point.

For example, in a case where the observer 2 allows the head to approach an image 53A in the virtual space including an image 33 of the observed person illustrated in FIG. 5B, the observer 2 can visually recognize an image 53B in the virtual space that is zoomed in toward the reference point 42 based on the gazing point. In such a case, the observer 2 can instinctively control the virtual camera with the motion of the head, and visually recognize the image in the virtual space with low sense of strangeness.

Also, as illustrated in FIG. 6A, in a case where the head of the observer 2 is moved in parallel in the right and left direction of the image 5 in the virtual space (i.e., a display device), the control unit 130 moves in parallel the angle-of-view of the virtual camera in the right and left direction of the reference point. Specifically, the control unit 130 moves in parallel the angle-of-view of the virtual camera so that the parallel moving direction of the head of the observer to the image 5 in the virtual space is symmetrical to the parallel moving direction of the angle-of-view of the virtual camera, with respect to the reference point. Under such control, even in a case where the observer 2 has moved to the image 5 in the virtual space, the control unit 130 can allow the observer 2 to visually recognize the image 5 in the virtual space having moved so that the target visually recognized advances in parallel.

For example, in a case where the observer 2 has moved in parallel to the right side relative to an image 54A in the virtual space including an image 34 of the observed person illustrated in FIG. 6B, the observer 2 can visually recognize an image 54B in the virtual space in which the image 34 of the observed person is moved in parallel to the right side relative to the reference point 42. In such a case, the observer 2 can continuously capture in front the target visually recognized also in the case of parallel movement to the image in the virtual space.

Further, the control unit 130 may execute the complex of the above-described control. Specifically, in a case of where the head of the observer 2 is rotated, the control unit 130 may rotate and move in parallel the virtual camera with respect to the reference point. Furthermore, in a case where the head of the observer 2 is moved in parallel, the control unit 130 may move in parallel and rotate the virtual camera with respect to the reference point. The control unit 130 executes the complex of such control, thereby enabling natural control of the virtual camera with low sense of strangeness with respect to the motion of the head of the observer 2.

Note that, preferably, the amount of motion of the virtual camera corresponding to the amount of the motion of the head of the observer 2 is appropriately set so as to reduce the sense of strangeness when the observer 2 visually recognizes the image in the virtual space. Also, the above-mentioned amount of motion of the virtual camera may be set on the basis of purposes, such as whether the observer 2 wants to match the line-of-sight to the observed person in the image in the virtual space, whether the observer 2 wants to do cooperative work with the observed person in the image in the virtual space, or whether the observer 2 wants to share the space with the observed person in the image in the virtual space.

Information for generating the image in the virtual space is inputted to the input unit 140. For example, the input unit 140 may be an imaging device, various sensors (e.g., a depth sensor), or the like installed in the real space. Also, the input unit 140 may be a wired or wireless external input interface such as a universal serial bus (USB) interface, an Ethernet (registered trademark) interface, or an IEEE802.11 standard interface to which information from the imaging device or various sensors installed in the real space is inputted.

The image information output unit 150 outputs information about the image in the virtual space including information about control of the angle-of-view of the virtual camera. Also, the image information output unit 150 may further output the information for generating the image in the virtual space, inputted to the input unit 140. For example, the image information output unit 150 may be an internal bus, a bridge, or an interface that outputs the information about the image in the virtual space to the image generating unit 160, alternatively, a wired or wireless external output interface such as a USB interface, an Ethernet interface, or an IEEE802.11 standard interface that outputs the information about the image in the virtual space to the image generating unit 160 that is externally provided for the information processing device 1.

The image generating unit 160 generates the image in the virtual space on the basis of information about the image in the virtual space outputted from the image information output unit 150. Specifically, the image generating unit 160 generates the image in the virtual space on the basis of the information for generating the image in the virtual space inputted to the input unit 140 and the angle-of-view of the virtual camera controlled by the control unit 130. For example, the image generating unit 160 may first generate the virtual space on the basis of the information for generating the image in the virtual space and, next, may generate the image in the virtual space included in the angle-of-view of the virtual camera.

Also, the image generating unit 160 may generate an image clearly illustrating the gazing point of the observer 2 in the generated image in the virtual space. In such a case, when controlling the angle-of-view of the virtual camera, the observer 2 can grasp the reference point of the control from the own gazing point and consequently can more instinctively instruct to control the angle-of-view of the virtual camera.

Figure 7:
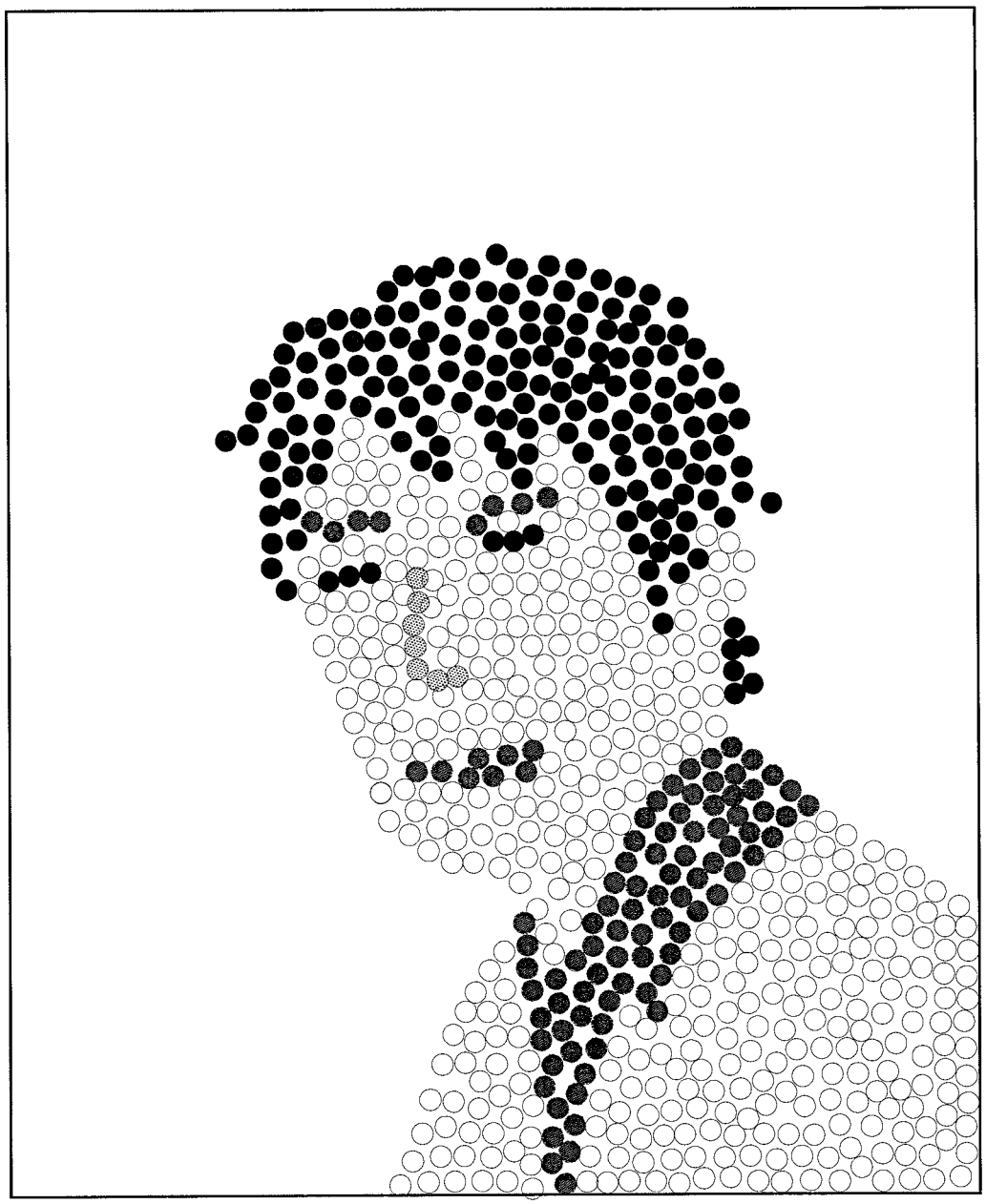
FIG. 7 is a schematic diagram illustrating a point cloud image generated by an image generating unit.
Figure 8:
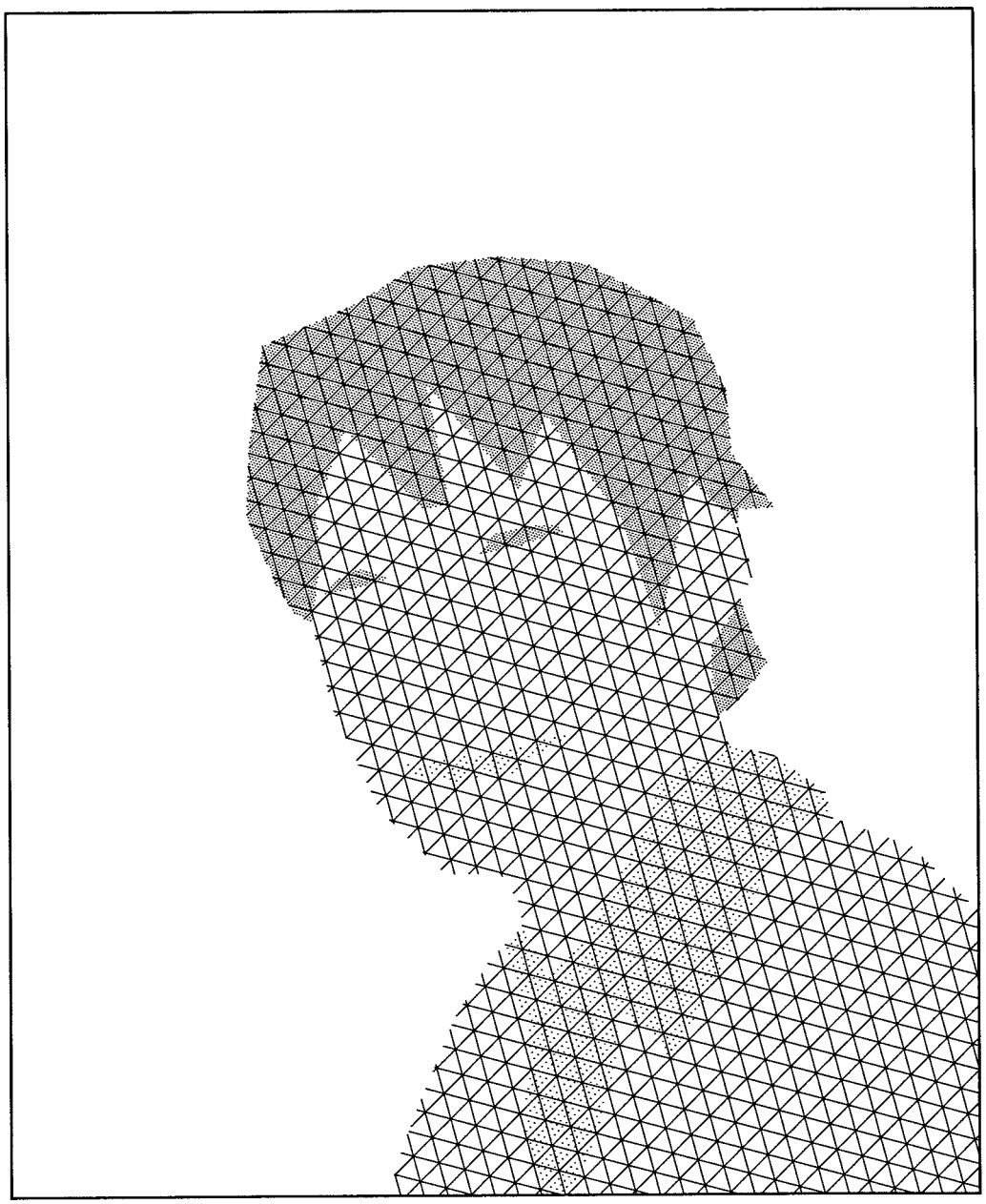
FIG. 8 is a schematic diagram illustrating a mesh image generated by the image generating unit.

Herein, a description will be given of the image in the virtual space generated by the image generating unit 160 with reference to FIGS. 7 and 8. FIG. 7 is a schematic diagram illustrating the point cloud image generated by the image generating unit 160. FIG. 8 is a schematic diagram illustrating a mesh image generated by the image generating unit 160.

As illustrated in FIG. 7, the image generating unit 160 may generate a point cloud image obtained by expressing a target in the virtual space as a set of dots, cubes, or squares. The point cloud image is an image obtained by expressing the target as a set of points arranged on the virtual space. Specifically, the point cloud image is generated by expressing the color and stereoscopic shape of the target as a set of points by using a depth sensor that measures the distance to the target and an imaging device that detects the color of the target.

Regarding a method for measuring the distance to the target by the depth sensor, a publicly-known method can be used. For example, it is possible to use a method for radiating infrared or the like and measuring the distance to the target from time until which reflecting light of the radiated infrared is returned, a method for radiating a pattern with infrared or the like and measuring the distance to the target from distortion of a pattern reflected on the target, a method for matching images imaged by a stereo-camera and measuring the distance to the target from parallax of the images, or the like.

Also, as illustrated in FIG. 8, the image generating unit 160 may generate a mesh image obtained by expressing the target with a polygon or the like. Note that a method for expressing the image in the virtual space by the image generating unit 160 is not limited to the above and a publicly-known method can be used.

With such a configuration, the information processing device 1 according to the present embodiment can control the angle-of-view of the virtual camera for defining the image in the virtual space by using the reference point set on the basis of the gazing point or the gazing target of the observer 2. As a consequence, the information processing device 1 can control the angle-of-view of the virtual camera while continuously capturing the target to be visually recognized by the observer 2 in the center of the image in the virtual space, and can allow the observer 2 to freely change the viewpoint in the virtual space. Therefore, the information processing device 1 enables the observer 2 to visually recognize the image in the virtual space with high convenience, with the target to be visually recognized hardly being out of the angle-of-view of the virtual camera.

1.3. Operation of Information Processing Device

Figure 9:
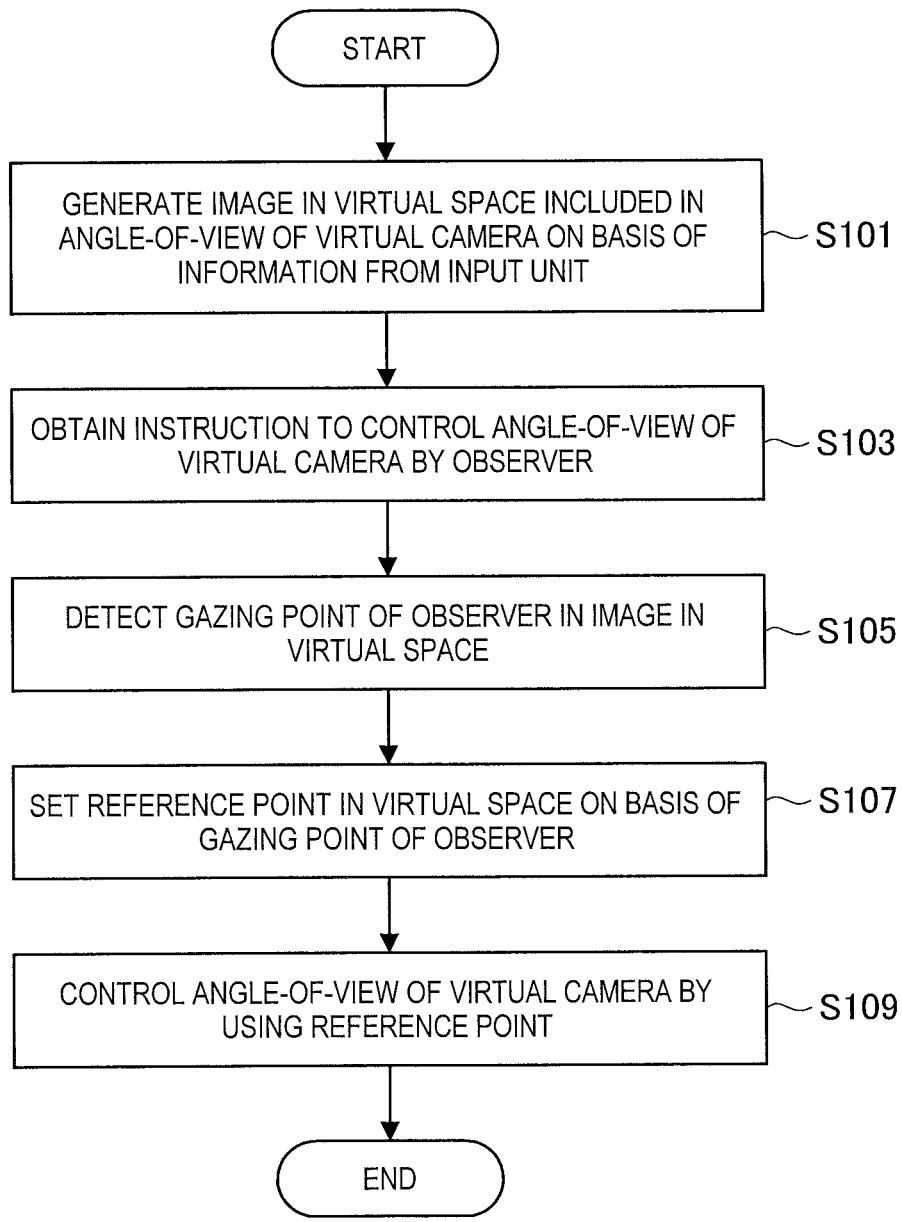
FIG. 9 is a flow chart illustrating an example of an operation of the information processing device according to the embodiment.

Subsequently, a description will be given of an operation of the information processing device 1 according to the present embodiment with reference to FIG. 9. FIG. 9 is a flow chart illustrating an example of an operation of the information processing device 1 according to the present embodiment. However, the following operational example is only an example, and the operation of the information processing device according to the present embodiment is not limited to the following shown example.

As illustrated in FIG. 9, the image generating unit 160 first generates the image in the virtual space included in the angle-of-view of the image camera on the basis of the information from the input unit 140 (S101). Herein, the information from the input unit 140 is, for example, the depth information of a target in the real space measured by the depth sensor, color information of a target in the real space measured by the imaging device, and the like. Next, an instruction to control the angle-of-view of the virtual camera by the observer 2 is obtained via the angle-of-view control information obtaining unit 120 (S103). Note that the instruction to control the angle-of-view of the virtual camera by the observer 2 is, for example, the motion of the head of the observer 2 or the like.

Subsequently, the gazing-point detecting unit 100 detects the gazing point of the observer 2 in the image in the virtual space (S105). The reference-point setting unit 110 sets the reference point in the virtual space on the basis of the gazing point of the observer 2 (S107). Next, the control unit 130 controls the angle-of-view of the virtual camera by using the set reference point in response to the instruction of the observer 2 (S109). Further, the image information output unit 150 outputs information about the image in the virtual space, including the information about the angle-of-view of the virtual camera. The image generating unit 160 generates the image in the virtual space included in the angle-of-view of the virtual camera after the control of the control unit 130. As a consequence, the observer 2 can freely control the angle-of-view of the virtual camera, and visually recognize the image in the virtual space.

1.4. Application of Information Processing Device

Figure 10:
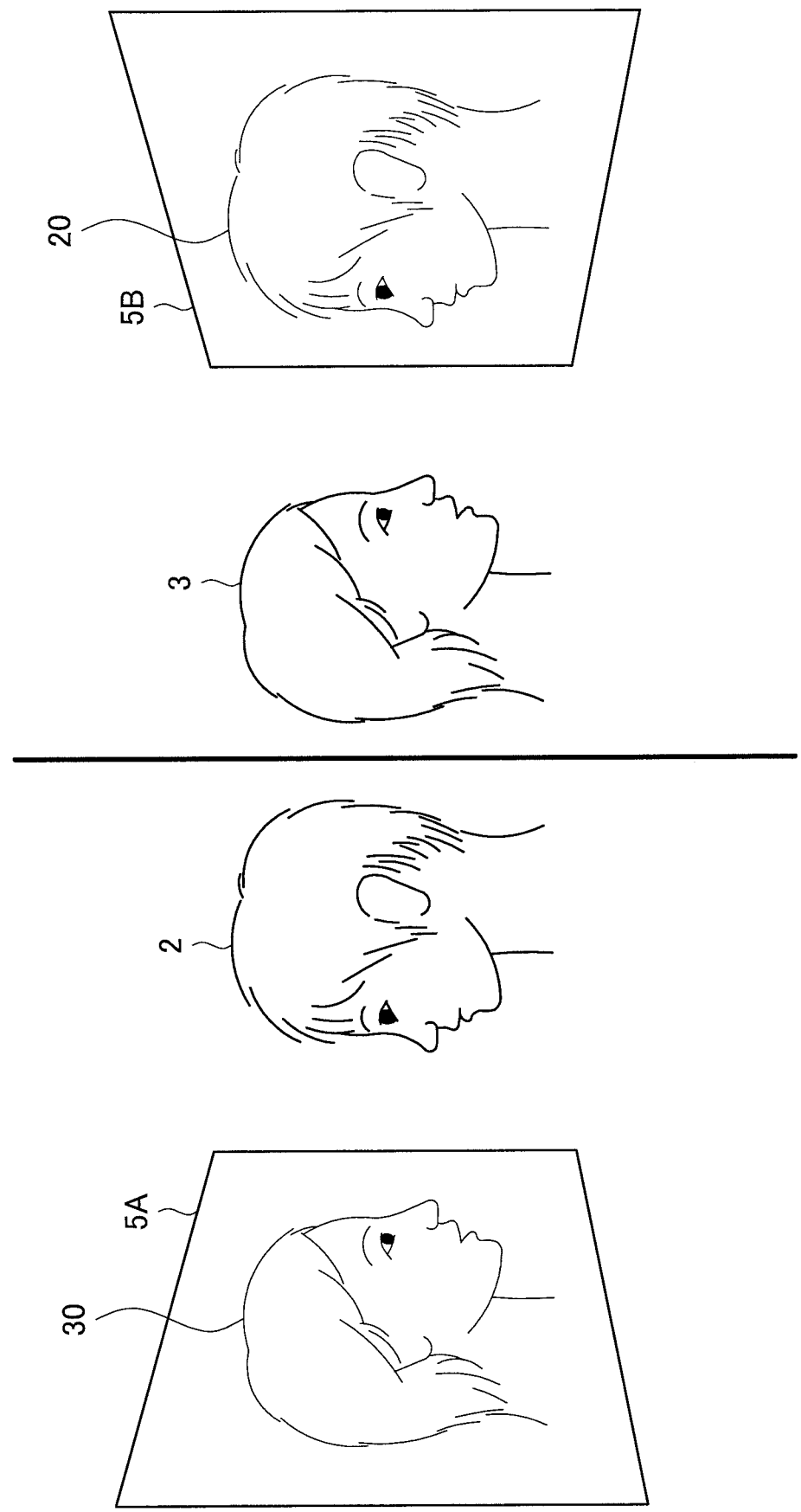
FIG. 10 is an explanatory diagram explaining a first application example of the information processing device according to the embodiment.
Figure 11:
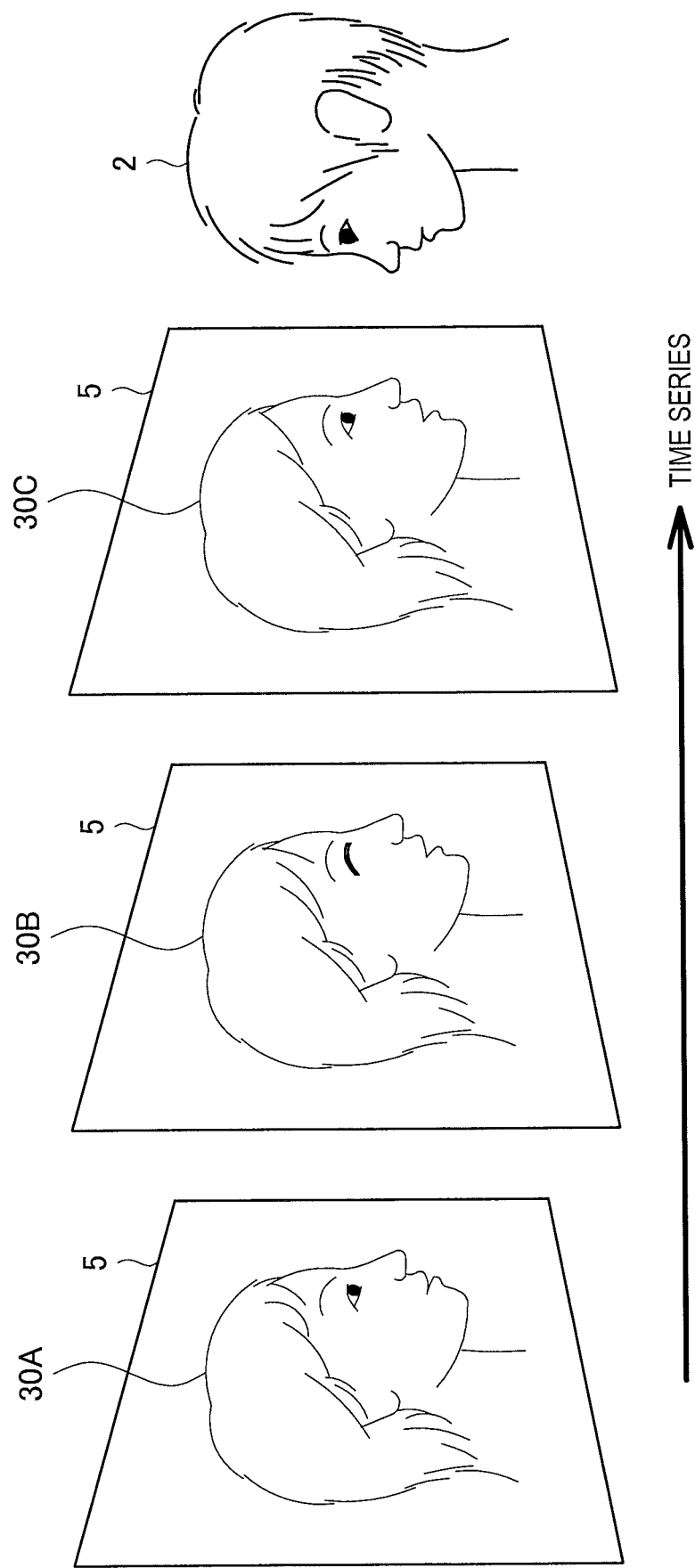
FIG. 11 is an explanatory diagram explaining a second application example of the information processing device according to the embodiment.

Next, a description will be given of an application example of the above-mentioned information processing device 1 according to the present embodiment with reference to FIGS. 10 and 11. FIG. 10 is an explanatory diagram explaining a first application example of the information processing device 1 according to the present embodiment. FIG. 11 is an explanatory diagram explaining a second application example of the information processing device 1 according to the present embodiment.

First Application Example

As illustrated in FIG. 10, the first application example of the information processing device 1 according to the present embodiment is a TV phone or a TV conference system for communication via an image and sound between the observer 2 and an observed person 3 that individually exist at remote areas.

Specifically, the observer 2 can communicate with the observed person while visually recognizing the image 30 thereof included in an image 5A in the virtual space by using the information processing device 1 according to the present embodiment. Also, the observed person 3 can similarly communicate with the observer while visually recognizing an image 20 thereof included in an image 5B in the virtual space by using the information processing device 1 according to the present embodiment. In such a case, for example, the image 5A in the virtual space may be based on the real space where the observed person 3 exists, and the image 5B in the virtual space may be based on the real space where the observer 2 exists.

With the information processing device 1 according to the present embodiment, it is possible to prevent the image 30 of the observed person from being out of the angle-of-view of the virtual camera and being lost even in a case where the observer 2 controls the angle-of-view of the virtual camera to change the viewpoint in the virtual space. Therefore, the observer 2 and the observed person 3 can communicate with each other with higher quality.

Second Application Example

As illustrated in FIG. 11, a second application example of the information processing device 1 according to the present embodiment is an image reproducing device that enables the observer 2 to visually recognize images 30A, 30B, and 30C of an event (e.g., a conference) in a free viewpoint by sequentially reproducing the images 5 in the virtual space on time series that are recorded in advance.

Specifically, the image 5 in the virtual space is not an image in real time based on the real space at the remote area or the like, but, for example, an image of an event such as a conference or an operation that is recorded in advance. The observer 2 visually recognizes the images 5 in the virtual space on time series while freely changing the viewpoint in the virtual space, thereby grasping the images 30A, 30B, and 30C of the event in a free viewpoint.

Also, such an image 5 in the virtual space on time series may be reproduced by varying reproducing speed to the actual speed of the event. As a consequence, the observer 2 can grasp the event in a shorter time than the actual time by making the reproducing speed of the images 5 on the virtual space on time series faster than the actual speed of the event. Moreover, the observer 2 can also grasp the event more deeply by making the reproducing speed of the images 5 on the virtual space on time series slower than the actual speed of the event.

With the information processing device 1 according to the present embodiment, the observer 2 can control the angle-of-view of the virtual camera by using the reference point based on the gazing point or the gazing target, and thus can visually recognize the image in the virtual space that reproduces a past event in a free viewpoint. Therefore, the observer 2 can grasp the reproduced past event in various viewpoints in multi-aspects.

The information processing device 1 according to the first embodiment of the present disclosure has been described above in detail.

2. Second Embodiment

Next, a description will be given of an information processing device according to a second embodiment of the present disclosure with reference to FIGS. 12 to 17.

The information processing device according to the present embodiment is a device for performing cooperative work with one-to-one correspondence or one-to-plural correspondence, and includes a unit that sends a notification of the position and the direction of the virtual camera as the viewpoint of the observer 2 to the observed person 3. Also, the information processing device according to the present embodiment includes a unit that outputs information about interference such as an operation and an instruction from the observer 2 to the observed person 3 so as to smoothly perform the cooperative work.

2.1. Configuration of Information Processing Device

Figure 12:
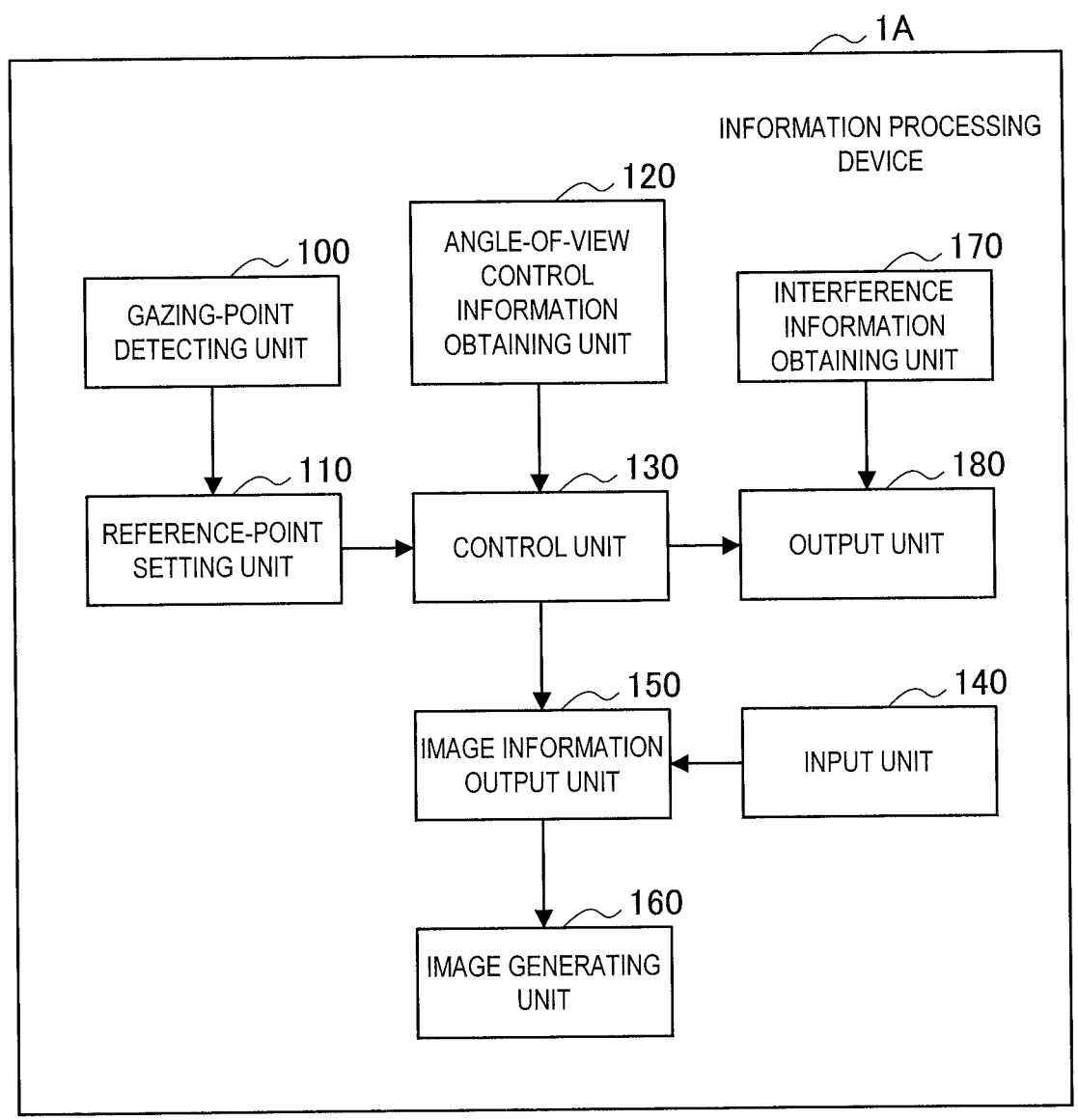
FIG. 12 is a block diagram illustrating a functional configuration of an information processing device according to a second embodiment of the present disclosure.

First, a description will be given of a configuration of an information processing device according to the present embodiment with reference to FIG. 12. FIG. 12 is a block diagram illustrating a functional configuration of an information processing device 1A according to the present embodiment.

As illustrated in FIG. 12, the information processing device 1A includes the gazing-point detecting unit 100, the reference-point setting unit 110, the angle-of-view control information obtaining unit 120, the control unit 130, the input unit 140, the image information output unit 150, the image generating unit 160, an interference information obtaining unit 170, and an output unit 180.

Note that the specific configurations of the gazing-point detecting unit 100, the reference-point setting unit 110, the angle-of-view control information obtaining unit 120, the control unit 130, the input unit 140, the image information output unit 150, and the image generating unit 160 are substantially similar to those explained in the first embodiment. Therefore, herein, a detailed description thereof is omitted.

The interference information obtaining unit 170 obtains information about the interference from the observer 2 to the real space where the observed person 3 exists, corresponding to the virtual space. Specifically, the interference information obtaining unit 170 obtains the information about the interference such as a call for attention and an operation of the cooperative work to the observed person 3 from the observer 2. For example, the interference information obtaining unit 170 may obtain information that prompts a call for attention for causing the observed person 3 to pay attention to a specific target in the real space, from the observer 2. Also, the interference information obtaining unit 170 may obtain operational information for operating a device (e.g., an air conditioning device, an illumination device, an information device, and the like) in the real space, from the observer 2.

Such an interference information obtaining unit 170 includes, for example, an input device that receives an input from the observer 2, and with the above-described interference information inputted by the input device, obtains information about the interference to the real space. As the input device that receives the input from the observer 2, for example, a touch panel, a mouse, a keyboard, a button, a microphone, a switch, a lever, and the like can be exemplified.

The output unit 180 outputs information about the position and the direction of the virtual camera in the virtual space. The information about the position and the direction of the virtual camera is used for, for example, sending a notification of the viewpoint of the observer 2 to the observed person 3.

For example, in a case where the observed person 3 wears a transmission-type or shielding-type head-mounted display device, the viewpoint of the observer 2 may be notified to the observed person 3 by superimposing an image indicating the position and the direction of the virtual camera on the image in the virtual space. Also, in a case where the observed person 3 visually recognizes a display device other than the head-mounted display device, the viewpoint of the observer 2 may be notified to the observed person 3 by allowing the display device to display an image indicating the position and the direction of the virtual camera. Herein, the image indicating the position and the direction of the virtual camera may be, for example, an image of the head of the observer 2, a fire ball, a light ball, or the like.

For example, in a case where the observed person 3 listens to the sound by a headphone, an earphone, a speaker, or the like, the viewpoint of the observer 2 may be notified to the observed person 3 by reproducing under three-dimensional sound-field control so that the sound of the observed person 3 is generated from the position indicating the position and the direction of the virtual camera.

Also, the output unit 180 outputs information about the interference to the real space corresponding to the virtual space, obtained by the interference information obtaining unit 170. The information about the interference to the real space is used for, for example, supporting the cooperative work to the observed person 3.

For example, in a case where the observed person 3 wears a transmission-type or shielding-type head-mounted display device, a call for attention to a specific target may be notified to the observed person 3 by superimposing an alert image on the image in the virtual space. Also, in a case where the observed person 3 visually recognizes a display device other than the head-mounted display device, the call for attention to the specific target may be notified to the observed person 3 by allowing the display device to display a character or the alert image. Herein, the alert image may be an image of a flickering light source, an image of an arrow, or the like.

For example, in a case where the observed person 3 listens to the sound by the headphone, the earphone, the speaker, or the like, the call for attention to the specific target may be notified to the observed person 3 under the three-dimensional sound-field control by reproducing the alert sound as if the sound is generated from the position where the specific target exists.

Also, the output unit 180 may output operational information from the observer 2 to a device (e.g., an air conditioning device, an illumination device, an information device, or the like) in the real space connected to the information processing device 1A via a network, thereby enabling the observer 2 to operate the device in the real space, in place of the observed person 3.

Such an output unit 180 may be, for example, a cable communication device that performs wired cable communication connectable with a communication network, or a wired or wireless LAN compatible communication device. Also, the output unit 180 may be, for example, a wired or wireless external output interface such as a USB interface, an Ethernet interface, or an IEEE802.11 standard interface. The output unit 180 can execute the above-mentioned control by outputting the information to the real space where the observed person 3 exists, for example, via the network or the like.

With such a configuration, it is possible to output information about the position and the direction of the virtual camera from the output unit 180 to the observed person 3. Therefore, the observer 2 can smoothly advance the cooperative work with the observed person 3. Also, it is possible to output information about the interference of the observer 2 from the output unit 180 to the real space where the observed person 3 exists. Thus, the observer 2 can support the cooperative work with the observed person 3.

2.2. Usage Example of Information Processing Device

Figure 13:
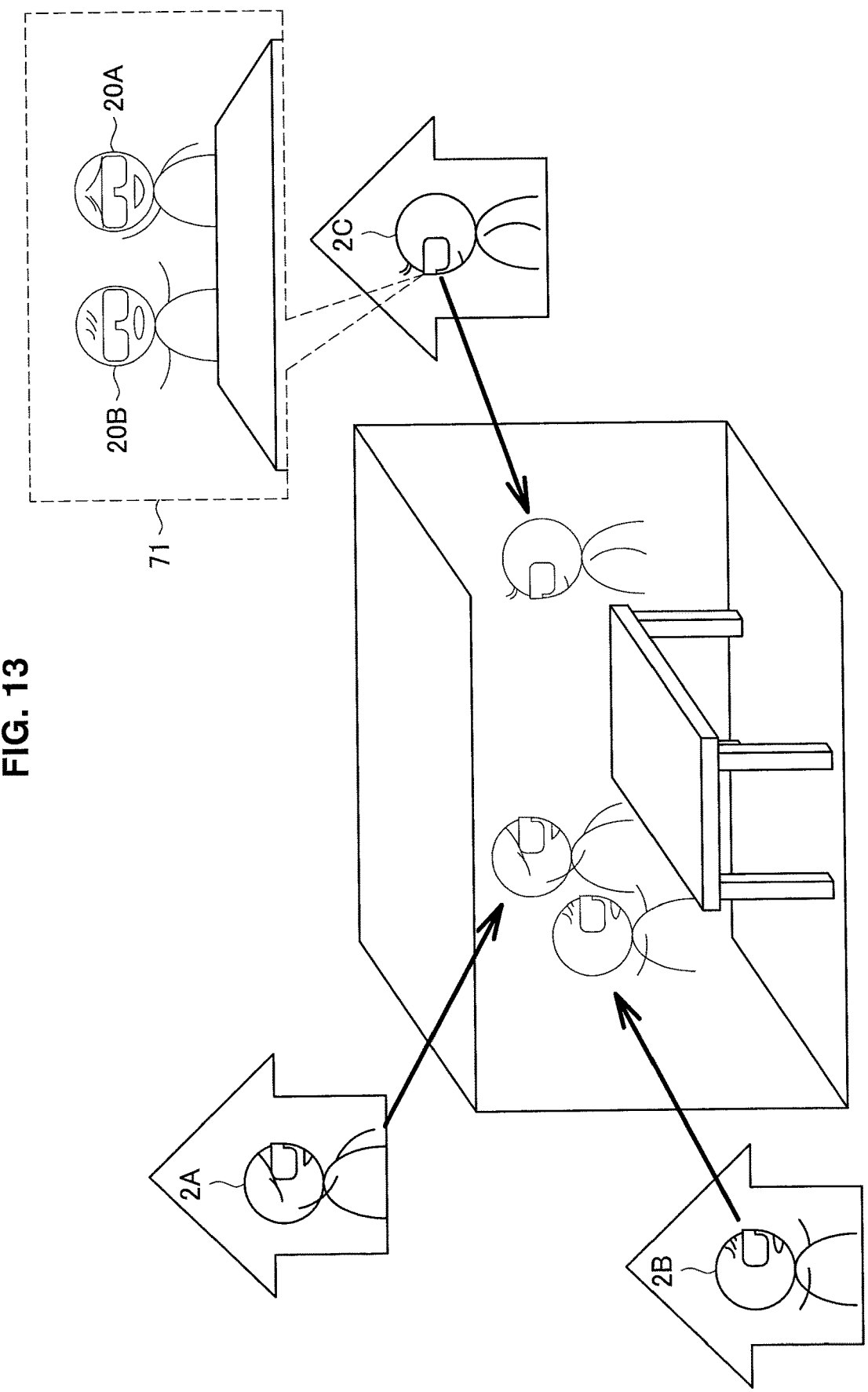
FIG. 13 is an explanatory diagram explaining a usage example of the information processing device according to the embodiment.
Figure 14:
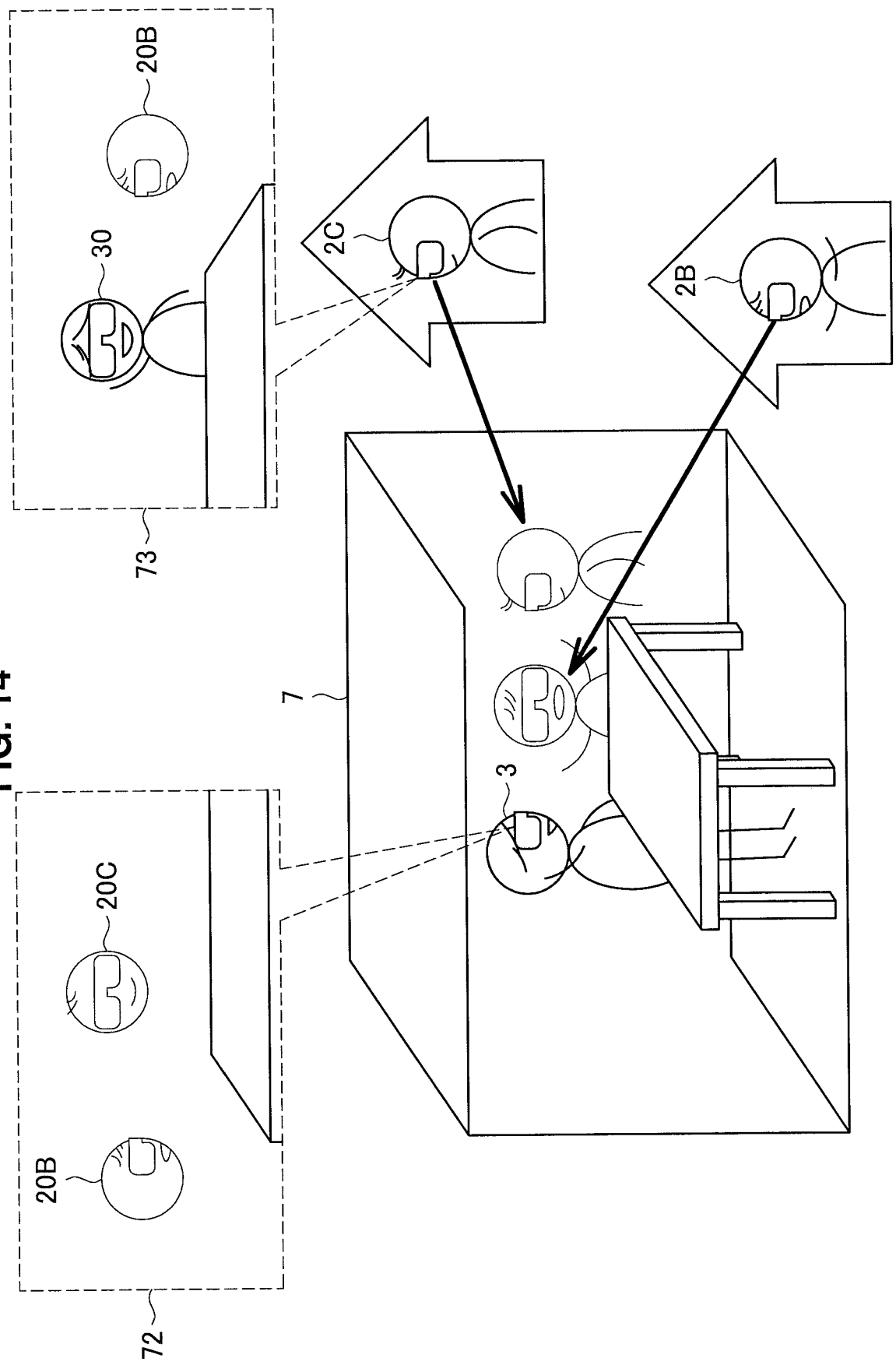
FIG. 14 is an explanatory diagram explaining a usage example of the information processing device according to the embodiment.
Figure 15:
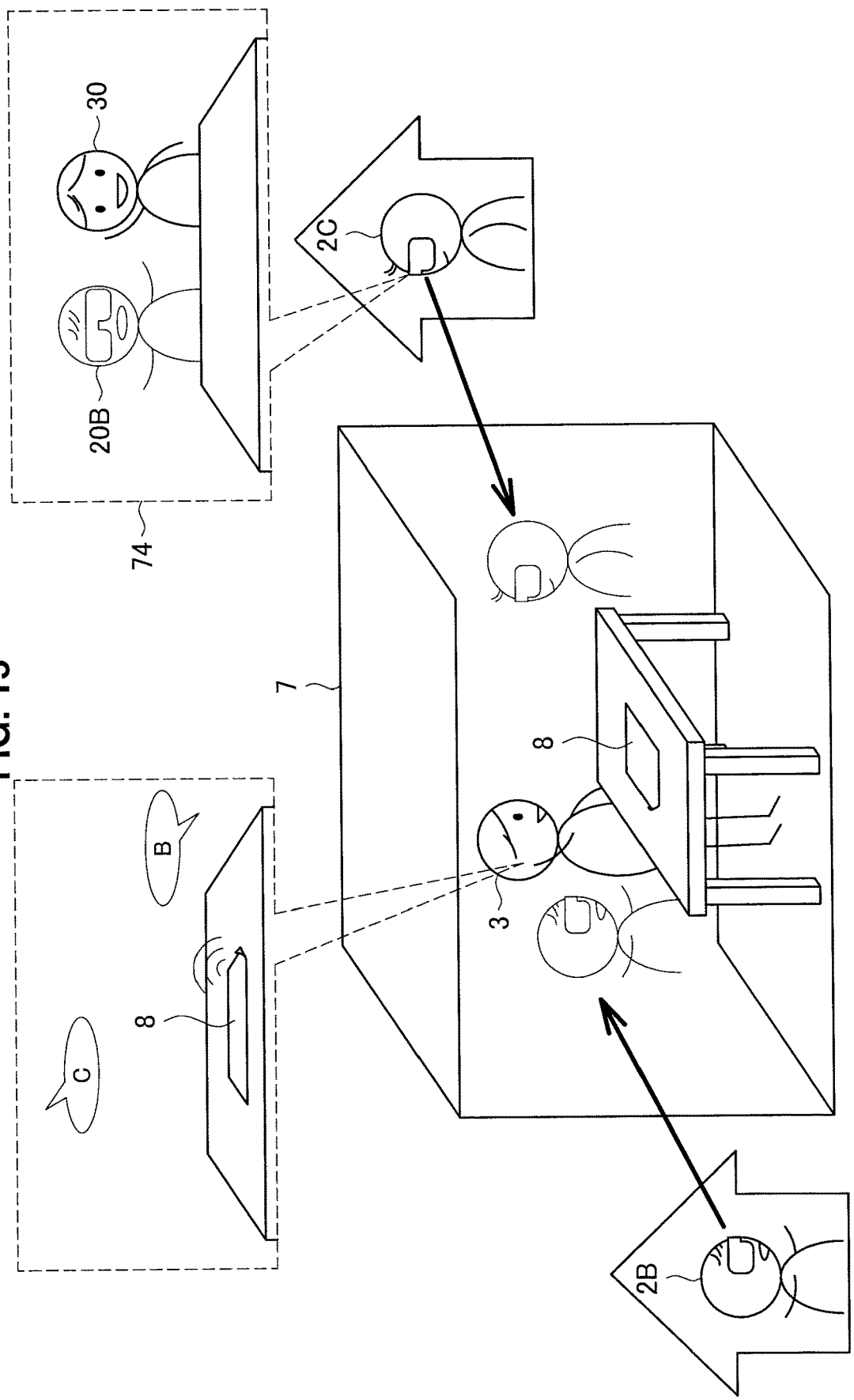
FIG. 15 is an explanatory diagram explaining a usage example of the information processing device according to the embodiment.

Next, a description will be given of a usage example of the information processing device 1A according to the present embodiment with reference to FIGS. 13 to 15. FIGS. 13 to 15 are explanatory diagrams explaining the usage example of the information processing device 1A according to the present embodiment.

As illustrated in FIG. 13, one usage example of the information processing device 1A according to the present embodiment is a usage example in a case where the observers 2A, 2B, and 2C individually existing at different remote areas execute a TV conference or the like in common virtual space. Specifically, the observers 2A, 2B, and 2C individually wear transmission-type or shielding-type head-mounted display devices, and visually recognize an image in the common virtual space, thereby sharing the virtual space. Note that a virtual object, for example, a desk, a chair, or the like may be arranged in the virtual space.

For example, images 20A and 20B of the observers 2A and 2B are displayed on an image 71 in the virtual space visually recognized by the observer 2C. Also, the observer 2C can change the viewpoint (i.e., the position and the direction of the virtual camera) in the virtual space by instructing the control of the angle-of-view of the virtual camera using the reference point based on line-of-sight information. As a consequence, the observer 2C can attend the TV conference or the like with the observers 2A and 2B, while freely changing the viewpoint in the virtual space. Note that, in a case where the observer 2C changes the viewpoint, in the images in the virtual space visually recognized by the observers 2A and 2B, the image of the observer 2C is preferably moved to the position of the viewpoint changed by the observer 2C.

Also, as illustrated in FIG. 14, one usage example of the information processing device 1A according to the present embodiment is a usage example in a case where the observers 2B and 2C existing at the remote areas and the observed person 3 perform the cooperative work. Specifically, the observers 2B and 2C and the observed person 3 individually wear the transmission-type or shielding-type head-mounted display devices and the observers 2B and 2C visually recognize the image in the virtual space corresponding to real space 7. Also, the observed person 3 visually recognizes images obtained by superimposing images indicating viewpoint positions of the observers 2B and 2C in the real space 7. Note that a desk, a chair, and the like existing in the real space 7 may be arranged as virtual objects in the virtual space visually recognized by the observers 2B and 2C.

For example, on an image 73 in the virtual space visually recognized by the observer 2C, the image 30 of the observed person 3 and the image 20B of the observer 2B are displayed. Herein, the image 20B of the observer 2B existing at the remote area is distinguished from the image 30 of the observed person 3 existing in the real space 7 and, for example, only an image of the head may be displayed. Also, the observer 2C can change the viewpoint (i.e., the position and the direction of the virtual camera) in the virtual space by instructing the control of the angle-of-view of the virtual camera using the reference point based on the line-of-sight information. As a consequence, the observer 2C can support the cooperative work to the observed person 3 while freely changing the viewpoint in the virtual space.

Also, the images 20B and 20C indicating the positions and the directions of the virtual camera are displayed at positions corresponding to the viewpoints of the observers 2B and 2C in an image 72 visually recognized by the observed person 3. For example, in a case where the observers 2B and 2C change the viewpoints in the virtual space, the positions of the images 20B and 20C indicating the positions and the directions of the virtual camera are also changed to corresponding positions. As a consequence, the observed person 3 can grasp from which position the observers 2B and 2C perform visual recognition and thus can more smoothly communicate therewith. Note that the images 20B and 20C indicating the positions and the directions of the virtual camera may be images of, for example, the heads of the observers 2B and 2C, in addition, an image of a fire ball, a light ball, or the like.

Further, as illustrated in FIG. 15, one usage example of the information processing device 1A according to the present embodiment is a usage example in a case where the observers 2B and 2C existing at the remote areas execute the cooperative work with the observed person 3. Specifically, the observers 2B and 2C individually wear a transmission-type or shielding-type head-mounted display devices, and the observers 2B and 2C visually recognize the image in the virtual space corresponding to the real space 7. Also, the observed person 3 does not visually recognize the transmission-type or shielding-type head-mounted display device, another display device, or the like, and communicates with the observers 2B and 2C with only sound. Note that a desk, a chair, and the like existing in the real space 7 may be arranged as virtual objects in the virtual space visually recognized by the observers 2B and 2C.

For example, in an image 74 in a virtual space visually recognized by the observer 2C, the image 30 of the observed person 3 and the image 20B of the observer 2B are displayed. Also, the observer 2C can change the viewpoint (i.e., the position and the direction of the virtual camera) in the virtual space by instructing the control of the angle-of-view of the virtual camera using the reference point based on the line-of-sight information. As a consequence, the observer 2C can support the cooperative work to the observed person 3 while freely changing the viewpoint in the virtual space.

Also, the observed person 3 listens to the sound of the observers 2B and 2C as if it is generated from the positions corresponding to the viewpoints of the observers 2B and 2C with a three-dimensional sound-field control technology. For example, in a case where the observers 2B and 2C change the viewpoints in the virtual space, the position where the observed person 3 feels that the sound of the observers 2B and 2C is generated is also changed to the position after changing the viewpoint. As a consequence, the observed person 3 can grasp from which position the observers 2B and 2C perform visual recognition with a position where the sound is generated. Therefore, it is possible to perform more smooth communication.

Further, in a case where the observers 2B and 2C indicate a target 8 in the real space 7 and generate a call for attention of the observed person 3, the observed person 3 may listen to the sound of the observers 2B and 2C or alert sound as if it might be generated from the target 8. As a consequence, it is possible to generate the call for attention to the target 8 to the observed person 3 with the sound. Therefore, the observed person 3 can more smoothly perform the cooperative work with the observers 2B and 2C.

2.3. Modified Examples

Figure 17:
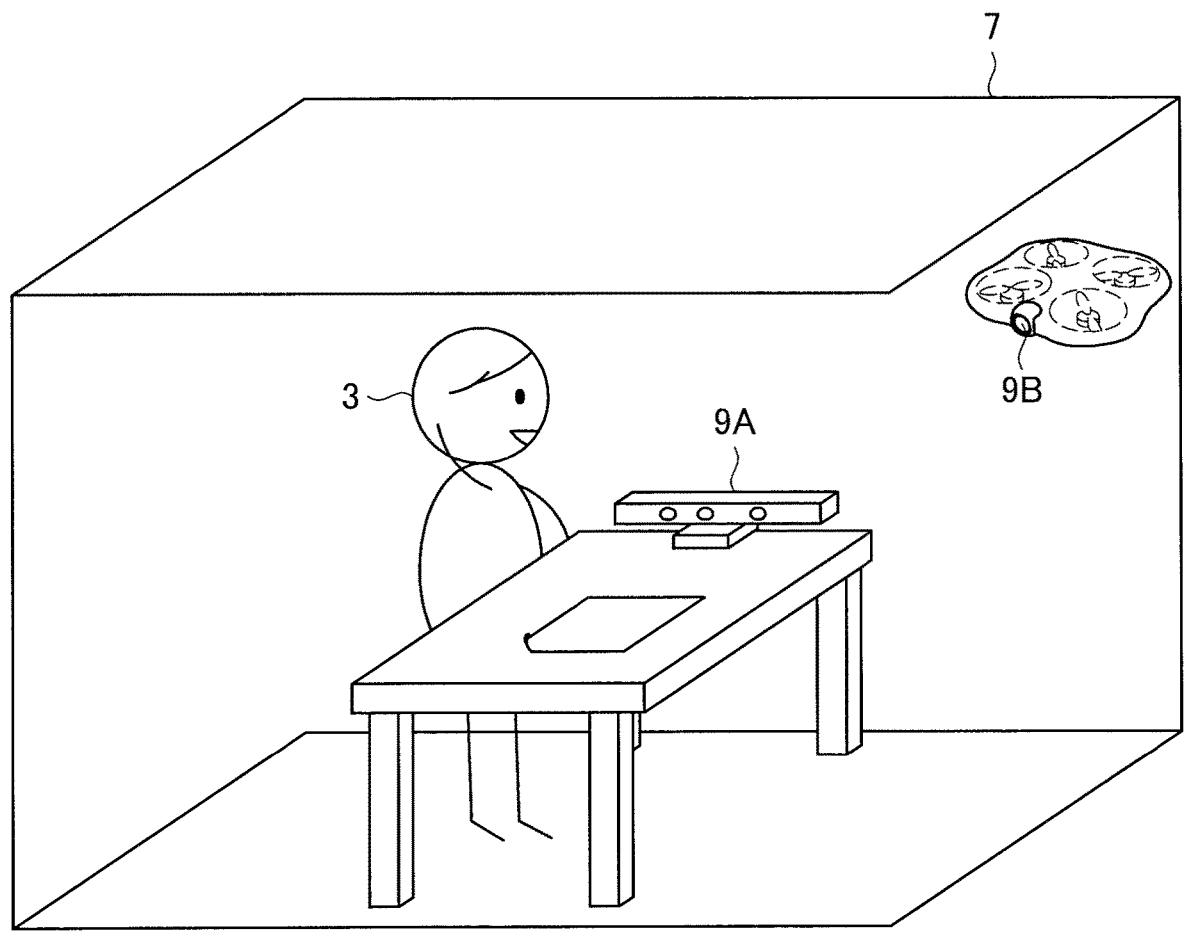
FIG. 17 is an explanatory diagram explaining an information processing device according to a second modified example of the embodiment.

Subsequently, a description will be given of the information processing device 1A according to each of modified examples of the present embodiment with reference to FIGS. 16 and 17. FIG. 16 is an explanatory diagram explaining the information processing device 1A according to a first modified example of the present embodiment. FIG. 17 is an explanatory diagram explaining the information processing device 1A according to a second modified example of the present embodiment.

First Modified Example

As illustrated in FIG. 16, for example, in a case where the observer 2 controls the angle-of-view of the virtual camera in the virtual space so as to support work of the observed person 3, the virtual camera can enter the inside of the observed person 3 (i.e., the rear side of the image in the virtual space). At this time, since an image of the observed person 3 is superimposed on an image of the observed person 3 on the hand side, it is difficult for the observer 2 to visually recognize the hand side of the observed person 3 in some cases.

In such a case, the information processing device 1A according to the present modified example may control not to display images of the head and a body portion 392 of the observed person 3 and to display only a hand portion 391 of the observed person 3. As a consequence, the information processing device 1A can generate the image in the virtual space for enabling clear visual recognition of the hand side of the observed person 3 for the observer 2, and can facilitate support of the work to the observed person 3 by the observer 2.

Also, in a case where the virtual camera enters the inside of the observed person 3, the information processing device 1A according to the present modified example may display images of the head and the body portion 392 of the observed person 3 only with a frame (i.e., outline). As a consequence, the information processing device 1A enables the observer 2 to visually recognize the hand side of the observed person 3 via transmission of the head and the body portion 392 of the observed person 3. Further, in a case where the virtual camera enters the inside of the observed person 3, the information processing device 1A according to the present modified example may change the color of the image of the head and the body portion 392 of the observed person 3 to color for causing the observer 2 to pay attention. As a consequence, the information processing device 1A enables the observer 2 to clearly recognize that the virtual camera enters the inside of the observed person 3.

Note that, the distinction between the head and the body portion 392, and the hand portion 391 of the observed person 3 can be determined by, for example, recognizing a pattern of the image of the observed person 3 imaged by the imaging device or the like with image analysis based on mechanical learning algorithm.

Also, the present modified example is not limited to the case where the virtual camera enters the inside of the observed person 3. For example, in a case where the virtual camera enters the inside of an object such as a desk in the virtual space, the information processing device 1A according to the present modified example may ensure the field-of-view in the virtual space for the observer 2 by non-display of a part of the entering object. As a consequence, even in the case where the virtual camera enters the inside of the object in the virtual space, the information processing device 1A can prevent images of a plurality of objects in the virtual space from being superimposed, and generate the images in the virtual space with high visual recognizability.

Second Modified Example

As illustrated in FIG. 17, in the information processing device 1A according to a modified example of the present embodiment, a depth sensor 9A or 9B is used to generate the image in the virtual space corresponding to the observed person 3 in the real space 7. For example, the depth sensor 9A may be installed to a desk or the like, and the depth sensor 9B may be installed to a flying object such as a drone.

Herein, the depth sensor is used for measuring the distance from the sensor to the target, and can therefore measure only the depth information from one direction. Therefore, in a case of rotating the angle-of-view of the virtual camera, an area where depth information is not measured in the real space 7, and the virtual space is not generated can be included in the angle-of-view of the virtual camera. Hence, in the present modified example, under the control of the angle-of-view of the virtual camera, the position and the direction of the depth sensor are also controlled, thereby suppressing that the area where the depth information is not measured and the virtual space is not generated is included in the angle-of-view of the virtual camera.

Specifically, with the depth sensor 9A installed to the desk or the like, under the control of the angle-of-view of the virtual camera, the direction for measuring the depth information may be changed by rotating the direction of the depth sensor 9A in the up, down, right, and left directions. As a consequence, it is possible to suppress that the area where the depth information is not measured and the virtual space is not generated is included in the angle-of-view of the virtual camera.

Also, with the depth sensor 9B installed to the flying object such as the drone, under the control of the angle-of-view of the virtual camera, the direction for measuring the depth information may be changed by controlling the position and the direction of the flying object. For example, the direction for measuring the depth information may be changed by controlling the flying object so that the position and the direction of the virtual camera in the virtual space match the position and the direction of the depth sensor 9B installed to the flying object in the real space. As a consequence, it is possible to suppress that the area where the depth information is not measured and the virtual space is not generated is included in the angle-of-view of the virtual camera.

Therefore, the information processing device 1A can perform the above-mentioned control by outputting information about the position and the direction of the virtual camera to the depth sensors 9A and 9B. As a consequence, even in a case where a number of the depth sensors for generating the virtual space is small, the information processing device 1A can efficiently generate the virtual space and present the image in the virtual space with high convenience to the observer 2.

3. Hardware Configuration

Figure 18:
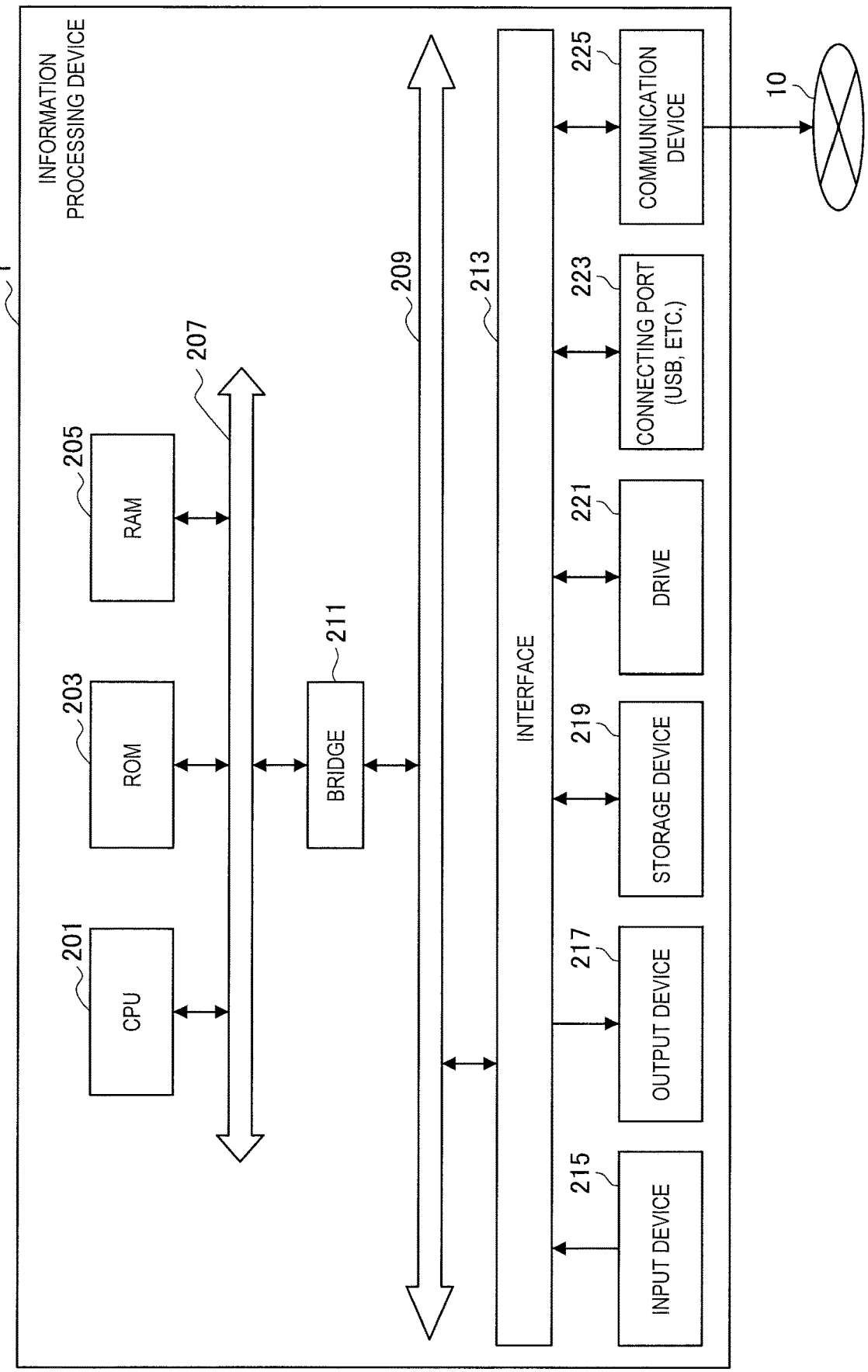
FIG. 18 is a block diagram illustrating an example of a hardware configuration of the information processing device according to each embodiment of the present disclosure.

Hereinbelow, a description will be given of an example of a hardware configuration of the information processing device 1 according to each embodiment of the present disclosure with reference to FIG. 18. FIG. 18 is a block diagram illustrating the example of the hardware configuration of the information processing device 1 according to each embodiment. Note that information processing with the information processing device 1 according to each embodiment is realized in cooperation of software and hardware.

As illustrated in FIG. 18, the information processing device 1 includes a central processing unit (CPU) 201, a read only memory (ROM) 203, a random access memory (RAM) 205, a bridge 211, internal buses 207 and 209, an interface 213, an input device 215, an output device 217, a storage device 219, a drive 221, a connecting port 223, and a communication device 225.

The CPU 201 functions as an arithmetic processing device and a control device, and controls the whole operations of the information processing device 1 according to various programs stored in the ROM 203 or the like. The ROM 203 stores a program and an arithmetic parameter used by the CPU 201, and the RAM 205 temporarily stores the program used in execution of the CPU 201 and parameters and the like that are appropriately changed in the execution. For example, the CPU 201 may execute the functions of the reference-point setting unit 110, the control unit 130, the image generating unit 160 and the like.

The CPU 201, the ROM 203 and the RAM 205 are mutually connected by the bridge 211, the internal buses 207 and 209, or the like. Moreover, the CPU 201, the ROM 203, and the RAM 205 are also connected to the input device 215, the output device 217, the storage device 219, the drive 221, the connecting port 223, and the communication device 225 via the interface 213.

The input device 215 includes an input device with which various information is inputted such as a touch panel, a keyboard, a mouse, a button, a microphone, a switch and a lever, imaging devices, and sensors that measure various information such as a depth sensor and an infrared sensor. Moreover, the input device 215 also includes an input control circuit that generates an input signal on the basis of the inputted or measured information and outputs the signal to the CPU 201. For example, the input device 215 may execute functions of the gazing-point detecting unit 100, the angle-of-view control information obtaining unit 120, the interference information obtaining unit 170, and the like.

The output device 217 includes, for example, various display devices such as a transmission-type or shielding-type head-mounted display device, a dome-type display that can display an image on the whole ceiling, display devices, e.g., a liquid crystal display device and an organic electro-luminescence display device, a 3D display device that can display a three-dimensional image, and a projector display device that can display a two-dimensional image or a three-dimensional image, and also includes a sound output device such as a speaker and a headphone.

The storage device 219 is a device for storing data, configured as an example of a storing unit of the information processing device 1. The storage device 219 may include a storage medium, a storing device that stores data into the storage medium, a reading device that reads data from the storage medium, and a deleting device that deletes the stored data.

The drive 221 is a read writer for the storage medium and is included in the information processing device 1 or externally attached thereto. For example, the drive 221 reads information stored in the attached magnetic disk, an optical disk or a magneto-optical disk, or a removable storage medium such as a semiconductor memory, and outputs the information to the RAM 203. Moreover, the drive 221 can also write the information to a removable storage medium.

For example, the connecting port 223 is a connecting interface including connecting ports, such as a USB port, an Ethernet port, an IEEE802.11 standard port, and an optical audio terminal, for connecting an external connecting device. For example, the connecting port 223 may execute functions of the input unit 140, the output unit 180, and the like. Also, in a case where the image generating unit 160 exists outside the information processing device 1, the connecting port 223 may execute a function of the image information output unit 150 or the like.

The communication device 225 is, for example, a communication interface including a communication device or the like for connecting to a network 10 such as a public line network. Also, the communication device 225 may be a cable communication device that performs wired cable communication, or a wired or wireless LAN compatible communication device. For example, the communication device 225 may execute the function of the output unit 180.

Also, it is possible to make a computer program for allowing hardware such as a CPU, a ROM and a RAM included in the information processing device 1 to exhibit a function similar to each configuration of the above-mentioned information processing device 1. Further, a storage medium that stores the computer program is provided.

4. Conclusion

As mentioned above, with the information processing device 1 according to the first embodiment of the present disclosure, the angle-of-view of the virtual camera for defining the image in the virtual space is controlled by using the reference point set on the basis of the gazing point or the gazing target of the observer 2. As a consequence, the information processing device 1 can cause the observer 2 to visually recognize the image in the virtual space with high convenience, in which a target visually recognized by the observer 2 does not go out of the angle-of-view of the virtual camera.

Also, with the information processing device 1A according to the second embodiment of the present disclosure, it is possible to output information about the position and direction of the virtual camera indicating the viewpoint of the observer 2 to the real space 7 where the observed person 3 exists. As a consequence, the information processing device 1A can send a notification about from which position the observer 2 performs visual recognition to the observed person 3, thereby enabling more smooth communication.

Further, with the information processing device 1A according to the second embodiment of the present disclosure, it is possible to output information about interference of the observer 2 to the real space 7 where the observed person 3 exists. As a consequence, the information processing device 1A can improve the efficiency of cooperative work between the observed person 3 and the observer 2.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a control unit that controls, on a basis of a gazing point or a gazing target of an observer to an image in a virtual space, an angle-of-view of a virtual camera for defining the image in the virtual space; and an image information output unit that outputs information about the image in the virtual space.

(2)

The information processing device according to (1), in which the control unit controls the angle-of-view of the virtual camera so that the gazing point or the gazing target is included in the image in the virtual space.

(3)

The information processing device according to (1) or (2), further including:

a reference-point setting unit that sets a reference point in the virtual space on a basis of the gazing point or the gazing target, in which the control unit controls the angle-of-view of the virtual camera so that the reference point is included in the image in the virtual space.

(4)

The information processing device according to (3), in which the control unit rotates the angle-of-view of the virtual camera with the reference point as a rotational center.

(5)

The information processing device according to (3) or (4), in which the control unit moves the angle-of-view of the virtual camera.

(6)

The information processing device according to any one of (3) to (5), further including:

a gazing-point detecting unit that detects the gazing point of the observer in the image in the virtual space on a basis of line-of-sight information of the observer, in which the reference-point setting unit sets the gazing point of the observer at predetermined timing as the reference point.

(7)

The information processing device according to any one of (3) to (5), further including:

a gazing-point detecting unit that detects the gazing point of the observer in the image in the virtual space on a basis of line-of-sight information of the observer, in which the reference-point setting unit sets, as the reference point, a point obtained by performing moving averaging on the gazing point of the observer for a predetermined period.

(8)

The information processing device according to any one of (1) to (7), in which the control unit controls the angle-of-view of the virtual camera in accordance with motion of a head of the observer.

(9)

The information processing device according to any one of (3) to (6), in which the control unit controls the angle-of-view of the virtual camera so that a direction of motion of a head of the observer is symmetrical to a direction of motion of the angle-of-view of the virtual camera with respect to the reference point.

(10)

The information processing device according to any one of (1) to (9), in which the control unit switches whether the angle-of-view of the virtual camera is fixed, or is movable or rotatable, on a basis of an input from the observer or line-of-sight information of the observer.

(11)

The information processing device according to any one of (1) to (10), in which the virtual space is three-dimensional space including an observed person.

(12)

The information processing device according to any one of (1) to (11), in which the image in the virtual space is generated on a basis of depth information measured by a depth sensor.

(13)

The information processing device according to (12), in which a direction of the depth sensor is controlled in accordance with the angle-of-view of the virtual camera.

(14)

The information processing device according to (13), in which the depth sensor is provided for a flying object, and the flying object is controlled in accordance with the angle-of-view of the virtual camera.

(15)

The information processing device according to any one of (1) to (14), further including:

an output unit that outputs information about a position and a direction of the virtual camera in the virtual space.

(16)

The information processing device according to any one of (1) to (15), further including:

an output unit that outputs information about interference of the observer to real space corresponding to the virtual space.

(17)

The information processing device according to any one of (1) to (16), in which, in a case where the virtual camera is positioned in an observed subject existing in the virtual space, at least a part of the observed subject is controlled not to be displayed in the image in the virtual space.

(18)

The information processing device according to (17), in which the observed subject is an observed person existing in the virtual space.

(19)

An information processing method including:

controlling, on a basis of a gazing point or a gazing target of an observer to an image in a virtual space, an angle-of-view of a virtual camera for defining the image in the virtual space by an arithmetic processing device; and outputting information about the image in the virtual space.

(20)

A program that causes a computer to function as:

a control unit that controls, on a basis of a gazing point or a gazing target of an observer to an image in a virtual space, an angle-of-view of a virtual camera for defining the image in the virtual space; and an image information output unit that outputs information about the image in the virtual space.

REFERENCE SIGNS LIST 1, 1A information processing device
2 observer
3 observed person
100 gazing-point detecting unit
110 reference-point setting unit
120 angle-of-view control information obtaining unit
130 control unit
140 input unit
150 image information output unit
160 image generating unit
170 interference information obtaining unit
180 output unit

The invention claimed is:

1. An information processing device comprising:
a control unit that controls, on a basis of a gazing point or
a gazing target of an observer to an image in a virtual space, an angle-of-view of a virtual camera for defining the image in the virtual space;
an image information output unit that outputs information about the image in the virtual space; and
a reference-point setting unit that sets the reference point in the virtual space on a basis of the gazing point or the gazing target,
wherein the control unit controls the angle-of-view of the virtual camera by setting a reference point that is continuously captured when a position of the virtual camera is moved,
wherein the image information output unit outputs the information about the image so that the reference point is included in the image in the virtual space,
wherein the position of the virtual camera is moved in accordance with motion of a head of the observer, and
wherein the control unit, the image information output unit, and the reference-point setting unit are each implemented via at least one processor.

2. The information processing device according to claim 1,
wherein the control unit further controls the angle-of-view of the virtual camera so that the gazing point or the gazing target is included in the image in the virtual space.

3. The information processing device according to claim 1,
wherein the control unit rotates the angle-of-view of the virtual camera in accordance with rotational motion of the head of the observer and with the reference point as a rotational center.

4. The information processing device according to claim 1,
wherein the control unit moves the angle-of-view of the virtual camera.

5. The information processing device according to claim 1, further comprising:
a gazing-point detecting unit that detects the gazing point of the observer in the image in the virtual space on a basis of line-of-sight information of the observer,
wherein the reference-point setting unit sets the gazing point of the observer at predetermined timing as the reference point, and
wherein the gazing-point detecting unit is implemented via the at least one processor.

6. The information processing device according to claim 1, further comprising:
a gazing-point detecting unit that detects the gazing point of the observer in the image in the virtual space on a basis of line-of-sight information of the observer,
wherein the reference-point setting unit sets, as the reference point, a point obtained by performing moving averaging on the gazing point of the observer for a predetermined period, and
wherein the gazing-point detecting unit is implemented via the at least one processor.

7. The information processing device according to claim 1,
wherein the control unit further controls the angle-of-view of the virtual camera in accordance with another motion of the head of the observer.

8. The information processing device according to claim 1,
wherein the control unit further controls the angle-of-view of the virtual camera so that a direction of the motion of the head of the observer is symmetrical to a direction of motion of the angle-of-view of the virtual camera with respect to the reference point.

9. The information processing device according to claim 1,
wherein the control unit switches whether the angle-of-view of the virtual camera is fixed, or is movable or rotatable, on a basis of an input from the observer or line-of-sight information of the observer.

10. The information processing device according to claim 1,
wherein the virtual space is three-dimensional space including an observed person.

11. The information processing device according to claim 1,
wherein the image in the virtual space is generated on a basis of depth information measured by a depth sensor.

12. The information processing device according to claim 11,
wherein a direction of the depth sensor is controlled in accordance with the angle-of-view of the virtual camera.

13. The information processing device according to claim 12,
wherein the depth sensor is provided for a flying object, and
the flying object is controlled in accordance with the angle-of-view of the virtual camera.

14. The information processing device according to claim 1, further comprising:
an output unit that outputs information about the position and a direction of the virtual camera in the virtual space,
wherein the output unit is implemented via the at least one processor.

15. The information processing device according to claim 1, further comprising:
an output unit that outputs information about interference of the observer to real space corresponding to the virtual space.

16. The information processing device according to claim 1,
wherein, in a case where the virtual camera is positioned in an observed subject existing in the virtual space, at least a part of the observed subject is controlled not to be displayed in the image in the virtual space.

17. The information processing device according to claim 16,
wherein the observed subject is an observed person existing in the virtual space.

18. An information processing method comprising:
controlling, on a basis of a gazing point or a gazing target of an observer to an image in a virtual space, an angle-of-view of a virtual camera for defining the image in the virtual space by an arithmetic processing device;
outputting information about the image in the virtual space; and
setting the reference point in the virtual space on a basis of the gazing point or the gazing target,
wherein the angle-of-view of the virtual camera is controlled by setting a reference point that is continuously captured when a position of the virtual camera is moved,
wherein the information about the image is output so that the reference point is included in the image in the virtual space, and wherein the position of the virtual camera is moved in accordance with motion of a head of the observer.

19. A non-transitory computer-readable storage medium having embodied thereon a program, which when executed by a computer causes the computer to execute a method, the method comprising:

controlling, on a basis of a gazing point or a gazing target of an observer to an image in a virtual space, an angle-of-view of a virtual camera for defining the image in the virtual space;

outputting information about the image in the virtual space; and setting the reference point in the virtual space on a basis of the gazing point or the gazing target, wherein the angle-of-view of the virtual camera is controlled by setting a reference point that is continuously captured when a position of the virtual camera is moved, wherein the information about the image is output so that the reference point is included in the image in the virtual space, and wherein the position of the virtual camera is moved in accordance with motion of a head of the observer.

20. The information processing device according to claim 1, wherein a zoom of the virtual camera is determined in accordance with translational motion of the head of the observer in a direction toward or away from the reference point.

* * * * *